(12) United States Patent
Kim et al.

(10) Patent No.: US 11,086,588 B2
(45) Date of Patent: Aug. 10, 2021

(54) DISPLAY APPARATUS

(71) Applicant: LG Display Co., Ltd., Seoul (KR)

(72) Inventors: Taehyung Kim, Paju-si (KR); Hyosung Lee, Paju-si (KR); SeungJun Koo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 69 days.

(21) Appl. No.: 16/574,789

(22) Filed: Sep. 18, 2019

(65) Prior Publication Data
US 2020/0097244 A1 Mar. 26, 2020

(30) Foreign Application Priority Data

Sep. 20, 2018 (KR) .................. 10-2018-0112981

(51) Int. Cl.
| | | |
|---|---|---|
| *G06F 3/16* | (2006.01) | |
| *G02F 1/1333* | (2006.01) | |
| *G06F 1/16* | (2006.01) | |
| *H02N 2/00* | (2006.01) | |
| *H04R 1/02* | (2006.01) | |

(52) U.S. Cl.
CPC .......... *G06F 3/16* (2013.01); *G02F 1/133308* (2013.01); *G06F 1/1601* (2013.01); *H02N 2/008* (2013.01); *H04R 1/02* (2013.01); *H04R 2499/11* (2013.01); *H04R 2499/13* (2013.01)

(58) Field of Classification Search
CPC ........ H04R 1/02; H04R 7/04; H04R 2499/11; H04R 2499/13; H04R 2499/15; G06F 3/16; G06F 1/1601; G02F 1/133308; H02N 2/008
See application file for complete search history.

(56) References Cited

U.S. PATENT DOCUMENTS

| | | |
|---|---|---|
| 2005/0025330 A1 | 2/2005 | Saiki et al. |
| 2006/0051075 A1 | 3/2006 | Wada |
| 2013/0064401 A1* | 3/2013 | Wang ..................... G06F 3/016 |
| | | 381/191 |

(Continued)

FOREIGN PATENT DOCUMENTS

| | | |
|---|---|---|
| CN | 1390429 A | 1/2003 |
| CN | 1581891 A | 2/2005 |

(Continued)

OTHER PUBLICATIONS

Office Action dated Feb. 19, 2021, issued in corresponding Eurpoean Patent Application No. 19 194 506.2.

(Continued)

*Primary Examiner* — Jason R Kurr
(74) *Attorney, Agent, or Firm* — Morgan, Lewis & Bockius LLP

(57) ABSTRACT

A display apparatus includes: a display panel configured to display an image, a vibration plate on a first surface of the display panel, a first structure on a second surface of the vibration plate, the first structure being configured to support the display panel, a first vibration-generating device configured to vibrate the vibration plate, and a separation part connected to the vibration plate and configured to separate a first space, facing a first surface opposite to the second surface of the vibration plate, from a second space facing the second surface of the vibration plate.

33 Claims, 10 Drawing Sheets

(56) References Cited

U.S. PATENT DOCUMENTS

| | | | | |
|---|---|---|---|---|
| 2014/0241558 A1* | 8/2014 | Yliaho | ................... | H04R 5/02 |
| | | | | 381/333 |
| 2015/0063595 A1* | 3/2015 | Kemppinen | ............. | H04R 1/24 |
| | | | | 381/101 |
| 2015/0185963 A1 | 7/2015 | Lee et al. | | |
| 2018/0288202 A1 | 10/2018 | Park et al. | | |
| 2019/0182573 A1 | 6/2019 | Shin et al. | | |
| 2019/0230423 A1* | 7/2019 | Guo | ................... | H04M 1/0266 |

FOREIGN PATENT DOCUMENTS

| | | | |
|---|---|---|---|
| CN | 108334165 A | 7/2018 | |
| CN | 108476362 A | 8/2018 | |
| EP | 3 499 337 A1 | 6/2019 | |
| WO | 01/41498 A2 | 6/2001 | |

OTHER PUBLICATIONS

Office Action dated May 8, 2021, issued in corresponding Chinese Patent Application No. 201910881363.3.

* cited by examiner

DISPLAY APPARATUS

CROSS-REFERENCE TO RELATED APPLICATION(S)

This application claims the benefit of and priority to Korean Patent Application No. 10-2018-0112981, filed on Sep. 20, 2018, the entirety of which is hereby incorporated by reference.

BACKGROUND

1. Technical Field

The present disclosure relates to a display apparatus.

2. Discussion of the Related Art

Recently, as society advances toward an information-oriented society, the field of display apparatuses for visually displaying an electrical information signal has rapidly advanced. Consequently, various display apparatuses having excellent performance, such as thinness, lightness, and low power consumption, are being developed. Examples of the display apparatuses include liquid crystal display (LCD) apparatuses, field emission display (FED) apparatuses, organic light-emitting display apparatuses, etc.

Generally, display apparatuses display an image on a display panel, but a separate speaker should be installed for providing a sound. When a speaker is installed in a display apparatus, a traveling direction of a sound output through the speaker is a direction toward a side portion or an upper/lower portion of the display panel, instead of toward a front surface or a rear surface of the display panel. Thus, the sound does not travel in a direction toward a viewer who is viewing an image in front of the display panel, and an immersion experience of the viewer is hindered. Moreover, when a speaker is included in a set apparatus such as a television (TV), the speaker occupies a certain space. Thus, the design and space disposition of the set apparatus are limited.

SUMMARY

Accordingly, the present disclosure is directed to a display apparatus that substantially obviates one or more of the issues due to limitations and disadvantages of the related art.

The inventors have recognized the above-described problems, and have conducted various experiments so that, when viewing an image in front of a display panel, a traveling direction of a sound becomes a direction toward a front surface of the display panel, and thus, sound quality is enhanced. Through the various experiments, the inventors have implemented a display apparatus having a new structure that outputs a sound having a traveling direction that is a direction toward a front surface of a display panel, thereby enhancing sound quality.

An aspect of the present disclosure is to provide a display apparatus that includes a vibration-generating device having a high-pitched sound range for vibrating a display panel, and a vibration-generating device having a low-pitched sound range for vibrating a vibration plate on one portion of the display panel, thereby enhancing a sound output characteristic of each of the high-pitched sound range and the low-pitched sound range.

Another aspect of the present disclosure is to provide a display apparatus that outputs vibrations, generated from both surfaces of a vibration plate, through both side surfaces of the display apparatus to enhance a sound output characteristic of a low-pitched sound range.

Another aspect of the present disclosure is to provide a display apparatus that uses, instead of a display panel, a vibration plate as a vibration plate of a low-frequency domain having a large vibration displacement, thereby providing a high-quality image.

Another aspect of the present disclosure is to provide a display apparatus that adjusts a resonance frequency of a display panel by forming an air gap between the display panel and a vibration-generating device vibrating a vibration plate, thereby improving a frequency characteristic.

Another aspect of the present disclosure is to provide a display apparatus that prevents heat, occurring in a vibration-generating device disposed on one surface of a display panel to vibrate a vibration plate, from being transferred to the display panel.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a display apparatus, including: a display panel configured to display an image, a vibration plate on a first surface of the display panel, a first structure on a second surface of the vibration plate, the first structure being configured to support the display panel, a first vibration-generating device configured to vibrate the vibration plate, and a separation part connected to the vibration plate and configured to separate a first space, facing a first surface opposite to the second surface of the vibration plate, from a second space facing the second surface of the vibration plate.

In another aspect, there is provided a display apparatus, including: a display panel configured to display an image, a vibration plate on a first surface of the display panel, a first structure on a second surface of the vibration plate, the first structure being configured to support the display panel, a first vibration-generating device between the display panel and the vibration plate, the first vibration-generating device being configured to vibrate the vibration plate, a second vibration-generating device that does overlap the first vibration-generating device, the second vibration-generating device being configured to vibrate the display panel, and a separation part connected to the vibration plate and configured to separate a first space, facing a first surface opposite to the second surface of the vibration plate, from a second space facing the second surface of the vibration plate.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this disclosure, illustrate embodiments of the disclosure and together with the description serve to explain various principles of the disclosure.

Figure 1:
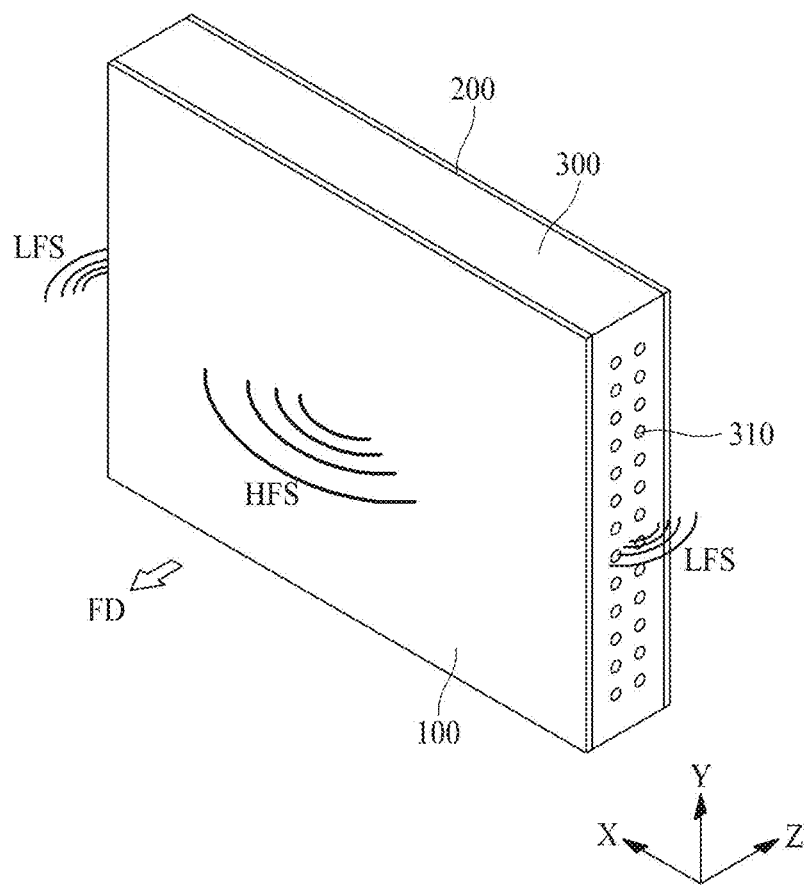
FIG. 1 is a perspective view of a display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted. When terms "comprise," "have," and "include" described in the present disclosure are used, another part may be added unless a more limiting term, such as "only," is used. The terms of a singular form may include plural forms unless referred to the contrary.

In construing an element, the element is construed as including an error or tolerance range even where no explicit description of such an error or tolerance range. In describing a position relationship, when a position relation between two parts is described as, for example, "on," "over," "under," or "next," one or more other parts may be disposed between the two parts unless a more limiting term, such as "just" or "direct(ly)," is used. In describing a time relationship, when the temporal order is described as, for example, "after," "subsequent," "next," or "before," a case that is not continuous may be included, unless a more limiting term, such as "just," "immediate(ly)," or "direct(ly)," is used.

It will be understood that, although the terms "first," "second," etc. May be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. These terms are merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" may apply, for example, to a separate circuit or structure, an integrated circuit, a computational block of a circuit device, or any structure configured to perform a described function as should be understood to one of ordinary skill in the art.

In the present disclosure, examples of a display apparatus may include a narrow-sense display apparatus, such as an organic light-emitting display (OLED) module or a liquid crystal module (LCM), including a display panel and a driver for driving the display panel. Also, examples of the display apparatus may include a set apparatus or a set electronic apparatus, such as a notebook computer, a TV, a computer monitor, an automotive display or another type of equipment display for vehicles, or a mobile electronic apparatus, such as a smartphone or an electronic pad, which is a complete product (or a final product) including an LCM or an OLED module. Therefore, in the present disclosure, examples of the display apparatus may include a narrow-sense display apparatus itself, such as an LCM or an OLED module, and a set apparatus, which is a final consumer apparatus or an application product including the LCM or the OLED module.

Depending on the case, an LCM or an OLED module, including a display panel and a driver, may be referred to as a "narrow-sense display apparatus," and an electronic apparatus, which is a final product including an LCM or an OLED module, may be referred to as a "set apparatus." For example, the narrow-sense display apparatus may include a display panel, such as an LCD or an OLED, and a source printed circuit board (PCB), which is a controller for driving the display panel. The set apparatus may further include a set PCB, which is a set controller electrically connected to the source PCB to overall control the set apparatus.

A display panel applied to an embodiment may use any type of display panel, such as a liquid crystal display panel, an organic light-emitting diode (OLED) display panel, and an electroluminescent display panel, but embodiments are not limited to a specific display panel. A display panel applied to an embodiment may be vibrated by a sound generation device to output sound. Also, a shape or a size of a display panel applied to a display apparatus according to the present embodiment is not limited.

For example, if the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin-film transistor (TFT), which is a switching element for adjusting a light transmittance of each of the plurality of pixels, an upper substrate including a color filter and/or a black matrix, and a liquid crystal layer between the array substrate and the upper substrate.

Moreover, if the display panel is the organic light-emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT, which is an element for selectively applying a voltage to each of the pixels, an organic light-emitting device layer on the array substrate, and an encapsulation substrate disposed on the array substrate to cover the organic light-emitting device layer. The encapsulation substrate may protect the TFT and the organic light-emitting device layer from an external impact, and may reduce or prevent water or oxygen from penetrating into the organic light-emitting device layer. Also, a layer provided on the array substrate may include an inorganic light-emitting layer (for example, a nano-sized material layer, a quantum dot, or the like). Alternatively, the layer provided on the array substrate may include a micro light-emitting diode.

Hereinafter, example embodiments of the present disclosure will be described in detail with reference to the accompanying drawings.

Figure 2:
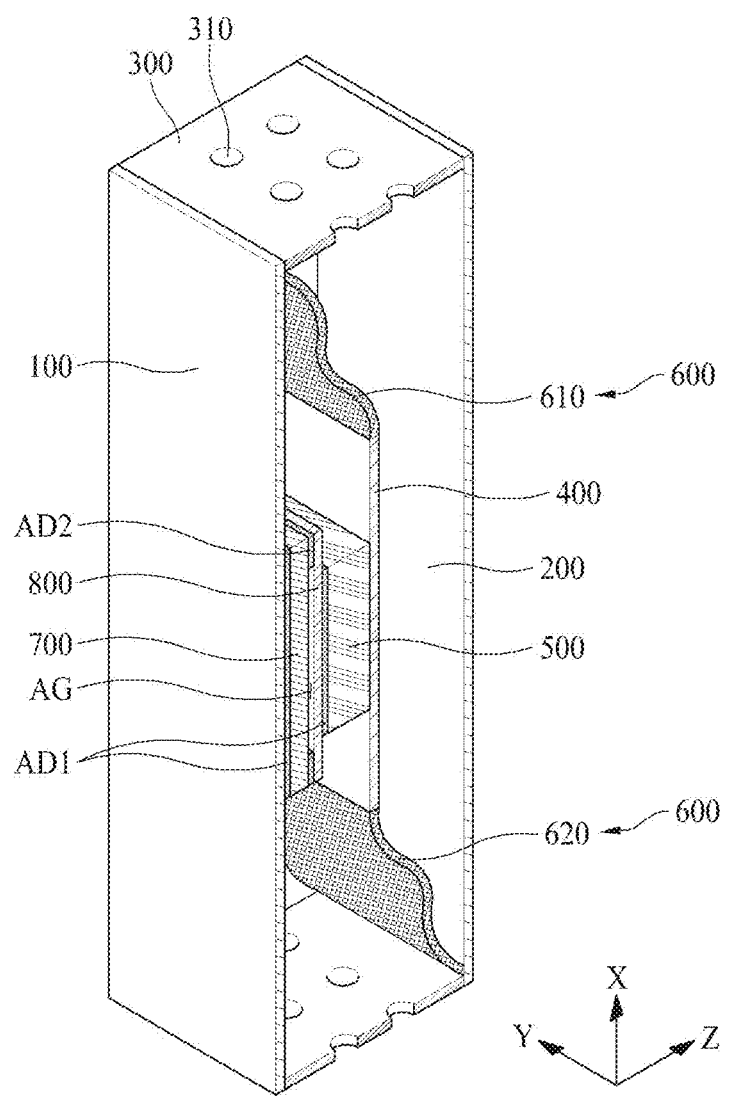
FIG. 2 is a cross-sectional perspective view of the display apparatus of FIG. 1.
Figure 3:
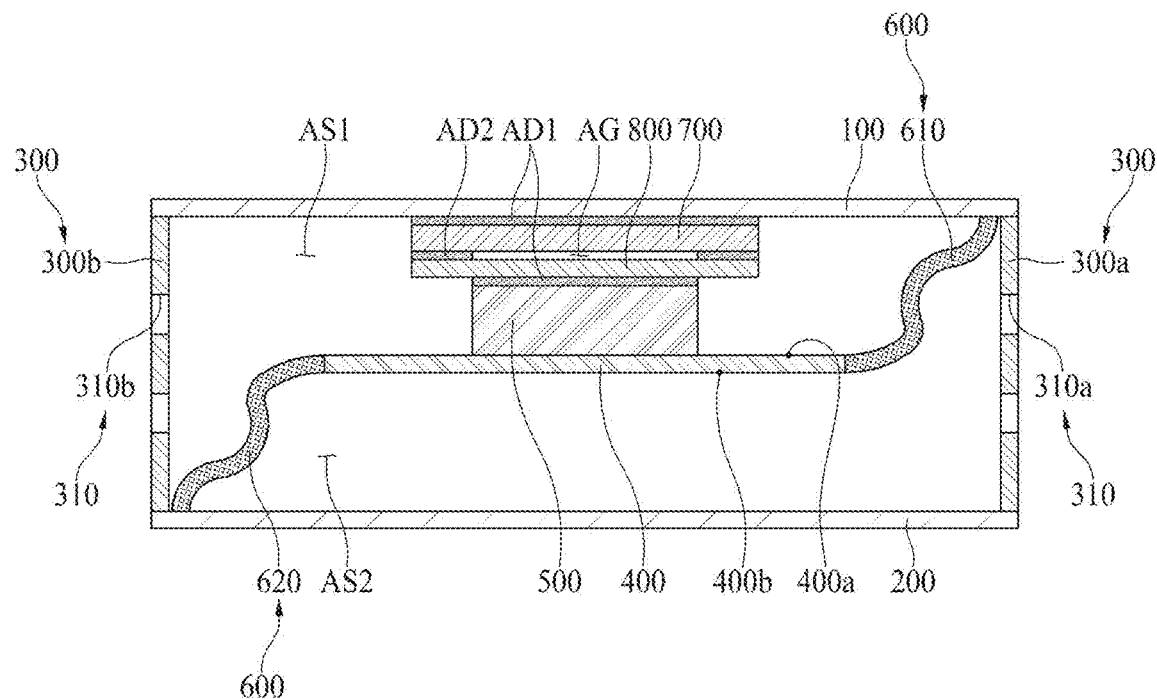
FIG. 3 is a cross-sectional view of the display apparatus of FIG. 1.
Figure 4:
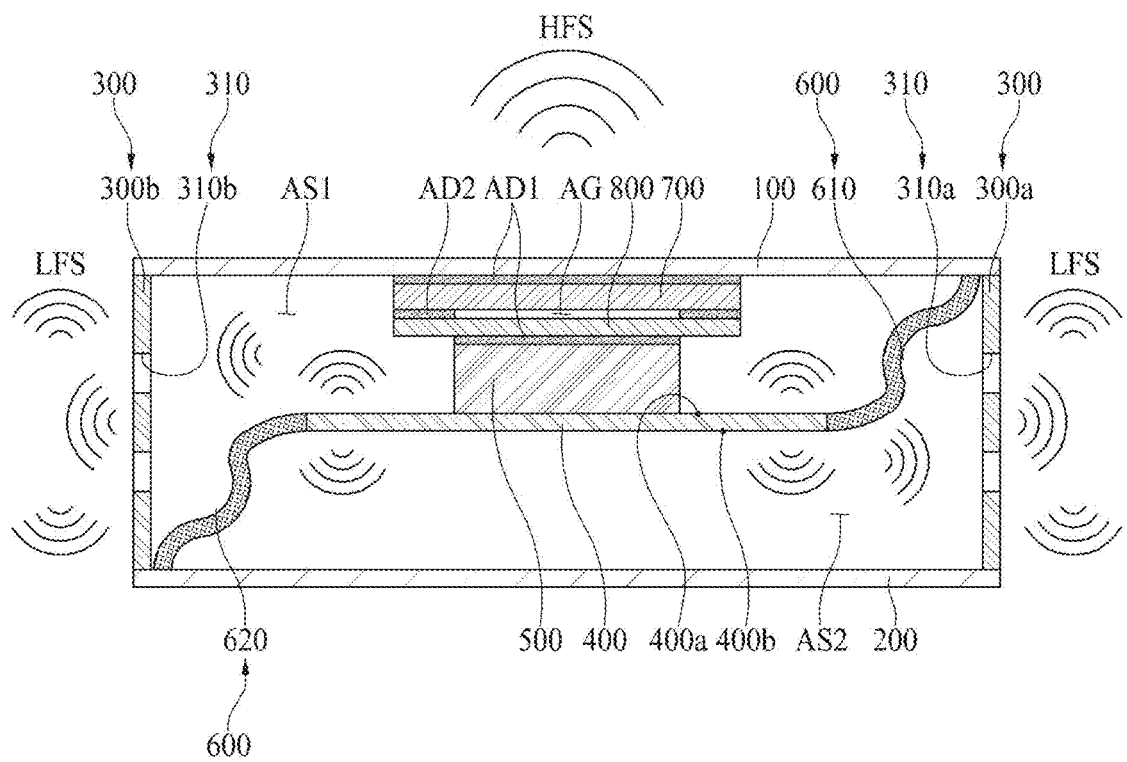
FIG. 4 is a diagram illustrating a path through which sound of each of a high-pitched sound range and a low-pitched sound range may be output in the display apparatus of FIG. 1.

FIG. 1 is a perspective view of a display apparatus according to an embodiment of the present disclosure. FIG. 2 is a cross-sectional perspective view of the display apparatus of FIG. 1. FIG. 3 is a cross-sectional view of the display apparatus of FIG. 1. FIG. 4 is a diagram illustrating a path through which sound of each of a high-pitched sound range and a low-pitched sound range may be output in the display apparatus of FIG. 1.

With reference to the examples of FIGS. 1 to 4, the display apparatus may include a display panel 100, a rear structure 200, a second structure 300, a vibration plate 400, a first vibration-generating device 500, a separation part 600, a second vibration-generating device 700, and a reinforcement plate 800. The display panel 100 may display an image, and may be implemented as any type of display panel, such as a liquid crystal display panel, an organic light-emitting diode (OLED) display panel, a micro light-emitting diode display panel, an electroluminescent display panel, etc. The display panel 100 may vibrate according to a vibration of the vibration generation device 200 to output sound.

The display panel 100 may include a pixel array, which may display an image based on image data. In the pixel array, a plurality of data lines may intersect a plurality of gate lines, and a plurality of pixels may be arranged as a matrix type. Each of the plurality of pixels may include a red subpixel, green subpixel, and a blue subpixel for implementing colors. Also, each of the plurality of pixels may further include a white subpixel. Embodiments are not limited to these examples.

The rear structure (or a first structure) 200 may be disposed on a second surface of the vibration plate 400 to support the display panel 100. According to an embodiment of the present disclosure, the rear structure 200 may be disposed on a rear surface (or a second surface) of each of the display panel 100 and the vibration plate 400 to support the display panel 100. For example, a front surface (or a first surface) of the display panel 100 may correspond to a surface that may display an image, and the rear surface (or the second surface) of the display panel 100 may correspond to an opposite surface with respect to the front surface (or the first surface). For example, the rear structure 200 may be spaced apart from the display panel 100, and may accommodate the first and second vibration-generating devices 500 and 700 disposed between the display panel 100 and the rear structure 200.

The rear structure 200 may cover the whole rear surface of the display panel 100 to be spaced apart from the whole rear surface, may have a plate shape, and may include a glass material, a metal material, and/or a plastic material. For example, an edge (or periphery) or a sharp corner of the rear structure 200 may have a tetragonal (or quadrilateral) shape or a curved shape, e.g., through a chamfer process or a corner rounding process. According to an embodiment of the present disclosure, the rear structure 200 including the glass material may include sapphire glass. For example, the rear structure 200 including the metal material may include one or more of: aluminum (Al), an Al alloy, a magnesium (Mg) alloy, and an alloy of iron (Fe) and nickel (Ni). As another example, the rear structure 200 may have a stacked structure including a glass plate and a metal plate, which may have a thickness relatively thinner than a metal plate and a glass plate, and may face the rear surface (or the first surface) of the display panel 100. For example, a rear surface of the display apparatus may be used as a mirror surface, e.g., due to the metal plate.

The second structure 300 may be disposed between an edge or periphery of the display panel 100 and an edge or periphery of the rear structure 200, and may connect the display panel 100 to the rear structure 200. According to an embodiment of the present disclosure, the second structure 300 may surround all (side) surfaces of the display apparatus, other than a front surface (or the second surface), with the display panel 100 disposed thereon and a rear surface with the rear structure 200 disposed thereon. Accordingly, the second structure 300 may be a housing of the display apparatus along with the rear structure 200.

The second structure 300 may include at least one hole 310, which may discharge a vibration, generated by the first vibration-generating device 500, to the outside. For example, the at least one hole 310 may be formed (e.g., bored) to have a circular or polygonal or any other suited shape in a plurality of regions of the second structure 300 in a thickness direction of the second structure 300.

According to an embodiment of the present disclosure, the second structure 300 may include a first hole 310a and a second hole 310b. The first hole 310a may be connected (or communicated) to a second air space (or air gap) AS2 facing a second surface 400b of the vibration plate 400, and may be disposed on a first portion 300a of the second structure 300. The second hole 310b may be connected (or communicated) to a first air space (or air gap) AS1 facing a first surface 400a of the vibration plate 400, and may be disposed on a second portion 300b of the second structure 300. As illustrated in FIG. 4, a vibration LFS generated from the first surface 400a of the vibration plate 400 may pass through the first air space AS1, and may be discharged to the other portion of the display apparatus through the second hole 310b in the second portion 300b of the second structure 300. Also, a vibration LFS generated from the second surface 400b of the vibration plate 400 may pass through the second air space AS2, and may be discharged to the one portion of the display apparatus through the first hole 310a in the first portion 300a of the second structure 300. For example, the first and second air spaces AS1 and AS2 may be separated from each other by the separation part 600 (and/or the vibration plate 400). Thus, the display apparatus may discharge low-frequency sound LFS, generated from the first surface 400a and the second surface 400b of the vibration plate 400, through the second hole 310b and the first hole 310a. Therefore, the display apparatus may reduce or prevent the low-frequency sound LFS, generated from the first surface 400a and the second surface 400b of the vibration plate 400, from being offset therebetween, and may enhance a sound pressure level (SPL) of each of the low-frequency sound LFS discharged to both portions of the display apparatus.

The vibration plate 400 may be on a first surface of the display panel 100. The vibration plate 400 may be between the display panel 100 and the rear structure 200, and may vibrate by the first vibration-generating device 500. According to an embodiment of the present disclosure, the vibration plate 400 may vibrate the first air space (or air gap) AS1 facing the first surface 400a of the vibration plate 400, and may vibrate the second air space (or air gap) AS2 facing the second surface 400b, which is opposite to the first surface 400a, of the vibration plate 400. For example, each of the first and second air spaces AS1 and AS2 may receive a low-frequency (or a low-pitched sound range) sound LFS generated by the first vibration generating apparatus 500. Vibrations of the first and second air spaces AS1 and AS2 may be respectively discharged through the first and second holes 310a and 310b disposed in both portions 300a and 300b of the second structure 300.

The first vibration-generating device 500 for generating the low-frequency (or a low-pitched sound range) sound LFS may need an area or a vibration displacement of a vibration plate equal to or higher than a certain level, for securing a sufficient sound output characteristic. For example, similarly to mobile electronic apparatuses, a display apparatus having a relatively small size may have a limitation in an area of the vibration plate. Thus, it may be difficult to secure a sound output characteristic of a low-frequency domain. Also, when the display apparatus uses, as a vibration plate, the display panel displaying an image, and increases a vibration displacement, a viewer may recognize or notice a vibration (or shaking) of the display panel. Also, when the vibration of the display panel is recognized or noticed by a viewer, an image displayed by the display panel may be shaken. Thus, the display apparatus may be unable to provide a high-quality image. Accordingly, the display apparatus according to an embodiment of the present disclosure may use, instead of the display panel 100, the vibration plate 400 as a vibration plate of the low-frequency domain having a large vibration displacement, thereby securing a sound output characteristic of the low-frequency domain, and providing a high-quality image.

The first vibration-generating device 500 may be disposed on the first surface of the display panel 100, and may vibrate the vibration plate 400. According to an embodiment of the present disclosure, the first vibration-generating device 500 may be between the display panel 100 and the vibration plate 400 to vibrate, and may transfer the vibration to each of the first and second air spaces AS1 and AS2 through the vibration plate 400. Therefore, the first vibration-generating device 500 may vibrate based on a vibration signal corresponding to a sound signal or a sound signal associated with an image to vibrate the vibration plate 400; and the first and second air spaces AS1 and AS2 may receive a vibration of the vibration plate 400, and may output the low-frequency sound LFS to both side surfaces of the display apparatus, respectively. Also, the low-frequency sound LFS output from the both side surfaces of the display apparatus may be provided toward a forward region in front of the display apparatus and a rearward region behind the display apparatus. Accordingly, the display apparatus may output the low-frequency sound LFS toward the forward region in front of the display apparatus using the vibration plate 400 as a vibration plate of the low-frequency domain. Thus, a position of an image displayed by the display apparatus may match a position of a sound generated by the display apparatus, thereby enhancing an immersion experience of a viewer who may be viewing the image displayed by the display apparatus.

According to an embodiment of the present disclosure, the first vibration-generating device 500 may be a speaker, and for example, may be a sound actuator, a sound exciter, or a piezoelectric device, but embodiments are not limited thereto. For example, the first vibration-generating device 500 may be a sound device for outputting sound according to an electrical signal.

The separation part 600 may be connected to the vibration plate 400, and may separate a space, facing the first surface 400a of the vibration plate 400, from a space facing the second surface 400b opposite to the first surface of the vibration plate 400. According to an embodiment of the present disclosure, the separation part 600 may include a first separation part 610 and a second separation part 620. The separation part 600 may be referred to as an "enclosure," "partition," or a "baffle," but the term is not limited thereto.

The first separation part 610 may connect a first portion (for example, a right portion) of the vibration plate 400 to a first portion (for example, a right portion) of the display panel 100, and the second separation part 620 may connect a second portion (for example, a left portion) opposite to first portion of the vibration plate 400 to a second portion (for example, a left portion) opposite to a first portion of the rear structure 200. For example, the first and second separation parts 610 and 620 may separate the space (for example, a first space) AS1, facing the first surface 400a of the vibration plate 400, from a space (for example, a third space) between the first portion (for example, a right portion) of the display panel 100 and the first portion (for example, a right portion) of the rear structure 200. Also, the first and second separation parts 610 and 620 may separate the space (for example, a second space) AS2, facing the second surface 400b of the vibration plate 400, from a space (for example, a fourth space) between the second portion (for example, a left portion) of the display panel 100 and the second portion (for example, a left portion) of the rear structure 200. Accordingly, the display panel 100, the separation part 600, the vibration plate 400, and the second portion 300b of the second structure 300 may surround the first air space AS1, and the rear structure 200, the separation part 600, the vibration plate 400, and the first portion 300a of the second structure 300 may surround the second air space AS2.

Therefore, the separation part 600 may separate the first and second air spaces AS1 and AS2 so that the low-frequency sound LFS of the first air space AS1 may be discharged through the second hole 310b of the second portion 300b of the second structure 300, and the low-frequency sound LFS of the second air space AS2 may be discharged through the first hole 310a of the first portion 300a of the second structure 300. Accordingly, when the display apparatus according to an embodiment of the present disclosure includes the separation part 600 for separating the first and second air spaces AS1 and AS2, vibrations or sounds generated from the first surface 400a and the second surface 400b of the vibration plate 400 may be reduced or prevented from being offset therebetween, and a sound pressure level (SPL) of each of the low-frequency sound LFS may be enhanced.

The separation part 600 may include a material having a good heat resistance, and thus, may maintain good mechanical physical properties in an extensive or high temperature. Also, the separation part 600 may include a material having high stiffness, high elasticity, and flexibility, and thus, may separate the first and second air spaces AS1 and AS2, without hindering the vibration or sound of the vibration plate 400. For example, the separation part 600 may include a polyimide fabric or a polyimide film, but embodiments are not limited thereto.

The second vibration-generating device 700 may be disposed on the first surface of the display panel 100 to vibrate the display panel 100. According to an embodiment of the present disclosure, the second vibration-generating device 700 may be attached to the first surface (or rear surface) of the display panel 100 by a first adhesive member AD1, and may vibrate the display panel 100 to output a high-frequency (or a high-pitched sound range) sound HFS toward a forward region FD in front of the display panel 100. For example, the first vibration-generating device 500 may generate the low-frequency sound LFS using the vibration plate 400 as a vibration plate, and the second vibration-generating device 600 may generate the high-frequency sound HFS using the display panel 100 as a vibration plate.

According to an embodiment of the present disclosure, the first and second vibration-generating devices 500 and 700 may overlap each other in a thickness direction of the display panel 100. For example, the first vibration-generating device 500 may vibrate the vibration plate 400 on the rear surface of the display panel 100, and the second vibration-generating device 700 may vibrate the display panel 100. Accordingly, the first and second vibration-generating devices 500 and 700 may be disposed to overlap each other, and may decrease an area overlapping the display panel 100, thereby enhancing a sound output characteristic, despite a display apparatus having a relatively small size, as in mobile electronic apparatuses.

According to an embodiment of the present disclosure, the second vibration-generating device 700 may include a piezopolymer, including, for example, one or more of: polyvinylidene fluoride (PVDF) homopolymer, PVDF copolymer, PVDF terpolymer, cyano-polymer, cyano-copolymer, and boron (BN) polymer, but embodiments are not limited thereto. Examples of the PVDF copolymer include PVDF-TrFE, PVDF-TFE, PVDF-CTFE, and PVDF-CFE, but embodiments are not limited thereto. Also, examples of the PVDF copolymer include PVDF-TrFe-CFE and PVDF-TrFE-CTFE, but embodiments are not limited thereto. Also, examples of the PVDF copolymer include PVDCN-vinyl acetate and PVDCN-vinyl propionate, but embodiments are not limited thereto. Also, examples of the BN polymer include polyaminoboran and polyaminodifluoroboran, but embodiments are not limited thereto.

The reinforcement plate 800 may be between the first and second vibration-generating devices 500 and 700. The reinforcement plate 800 may be on a first surface of the first vibration-generating device 500 facing the display panel 100 using the first adhesive member AD1.

The display apparatus according to an embodiment of the present disclosure may further include a second adhesive member AD2, which may be disposed between an edge or periphery of the reinforcement plate 800 and an edge or periphery of the second vibration-generating device 700, and may attach (or couple) the reinforcement plate 800 to the second vibration-generating device 700. For example, the second adhesive member AD2 may include one or more of: a pressure-sensitive adhesive (PSA), an optically clear resin (OCR), an optically clear adhesive (OCA), and a double-sided tape, but embodiments are not limited thereto.

According to an embodiment of the present disclosure, the second adhesive member AD2 may include a material that is higher in stiffness than the first adhesive member AD1. For example, the second adhesive member AD2 may include a hard-type double-sided tape, including one or more of: acryl, polycarbonate, glass, and polyimide, but embodiments are not limited thereto.

The display apparatus according to an embodiment of the present disclosure may further include an air gap AG surrounded by the second vibration-generating device 700, the reinforcement plate 800, and the second adhesive member AD2. Also, a thickness of the air gap AG may be set based on a thickness of the second adhesive member AD2. The air gap AG may be provided in a space between the second vibration-generating device 700 and the reinforcement plate 800 overlapping the first vibration-generating device 500. Thus, a vibration or sound of the low-frequency domain generated by the first vibration-generating device 500 may be attenuated or prevented from being transferred to the second vibration-generating device 700.

According to an embodiment of the present disclosure, the display apparatus may determine a first resonance frequency, based on a mass of the first vibration-generating device 500, a material and a thickness of the reinforcement plate 800, and a deflection value determined based on a position of a supporting point or portion that supports the reinforcement plate 800. For example, the second adhesive member AD2 between an edge or periphery of the reinforcement plate 800 and an edge or periphery of the second vibration-generating device 700 may be used as the supporting point or portion that supports the reinforcement plate 800. Accordingly, the second adhesive member AD2 may support the edge or periphery of the reinforcement plate 800, and thus, may form the air gap AG between the reinforcement plate 800 and the second vibration-generating device 700, and may determine a deflection value corresponding to the reinforcement plate 800 for setting the first resonance frequency.

According to an embodiment of the present disclosure, the display apparatus may determine a second resonance frequency, based on a mass of an equivalent module on the display panel 100, a material and a thickness of the display panel 100, and a deflection value determined based on a position of a supporting point or portion that supports the display panel 100. For example, the equivalent module on the display panel 100 may correspond to one module having the same characteristic as that of a module implemented by coupling or connecting the second vibration-generating device 700, the second adhesive member AD2, the reinforcement plate 800, and the first vibration-generating device 500. Also, the second structure 300 may be used as the supporting point or portion that supports the display panel 100. Accordingly, the second structure 300 may support the edge or periphery of the display panel 100, and thus, may be used as a housing of the display apparatus, and may determine a deflection value corresponding to the display panel 100 for setting the first resonance frequency.

For example, a first resonance frequency '$f$' corresponding to the reinforcement plate 800 and a second resonance frequency '$f$' corresponding to the display panel 100 may each be determined based on a deflection value '$\delta$' as in the following Equation.

$$f = \frac{1}{2\pi}\left(\frac{g}{\delta}\right)^{0.5} \qquad \text{[Equation]}$$

For example, '$g$' denotes an acceleration of gravity (for example, 9.81 m/s$^2$), and '$\delta$' denotes a deflection value corresponding to the reinforcement plate 800 or the display panel 100. For example, when the deflection value '$\delta$' increases, the resonance frequency '$f$' may decrease, and when the deflection value '$\delta$' decreases, the resonance frequency '$f$' may increase. Therefore, the first resonance frequency may be set based on a mass of the first vibration-generating device 500, a material and a thickness of the reinforcement plate 800, and a deflection value determined based on a position of a supporting point or portion that supports the reinforcement plate 800; and the second resonance frequency may be set based on a mass of an equivalent module on the display panel 100, a material and a thickness of the display panel 100, and a deflection value determined based on a position of a supporting point or portion that supports the display panel 100.

According to an embodiment of the present disclosure, the display apparatus may identically set the first resonance frequency '$f$' corresponding to the reinforcement plate 800 and the second resonance frequency '$f$' corresponding to the display panel 100. Thus, the display apparatus may allow a vibration of the reinforcement plate 800 to overlap a vibration of the display panel 100, thereby enhancing a sound pressure level in a corresponding frequency domain.

According to another embodiment of the present disclosure, the display apparatus may set or adjust the first resonance frequency '$f$' corresponding to the reinforcement plate 800 to a frequency '$n$' (where '$n$' is a natural number greater than or equal to two) times the second resonance frequency '$f$' corresponding to the display panel 100. Thus, the display apparatus may allow the vibration of the reinforcement plate 800 to overlap the vibration of the display panel 100, thereby enhancing a sound pressure level in a corresponding frequency domain.

Therefore, the display apparatus may identically set the first resonance frequency '$f$' corresponding to the reinforcement plate 800 and the second resonance frequency '$f$' corresponding to the display panel 100, or may set the first resonance frequency '$f$' corresponding to the reinforcement plate 800 to a frequency that is '$n$' times the second resonance frequency '$f$' corresponding to the display panel 100. Thus, the display apparatus may amplify the vibration of the reinforcement plate 800 and the vibration of the display panel 100, thereby enhancing a sound output characteristic in a low-pitched sound range.

According to an embodiment of the present disclosure, the display apparatus may adjust a resonance frequency having a haptic function, based on the first resonance frequency '$f$' corresponding to the reinforcement plate 800 and the second resonance frequency '$f$' corresponding to the display panel 100. The reinforcement plate 800 may be used as a vibration plate corresponding to a low-frequency domain, and the display panel 100 may be used as a vibration plate corresponding to a high frequency domain, whereby the reinforcement plate 800 may have the haptic function. For example, the display apparatus may identically set the first resonance frequency 'f' corresponding to the reinforcement plate 800 and the second resonance frequency 'f' corresponding to the display panel 100, or may set the first resonance frequency 'f' corresponding to the reinforcement plate 800 to a frequency that is 'n' times the second resonance frequency 'f' corresponding to the display panel 100. Thus, the display apparatus may apply the haptic function for providing a user with a feedback that may transfer a touch sensation.

Figure 5:
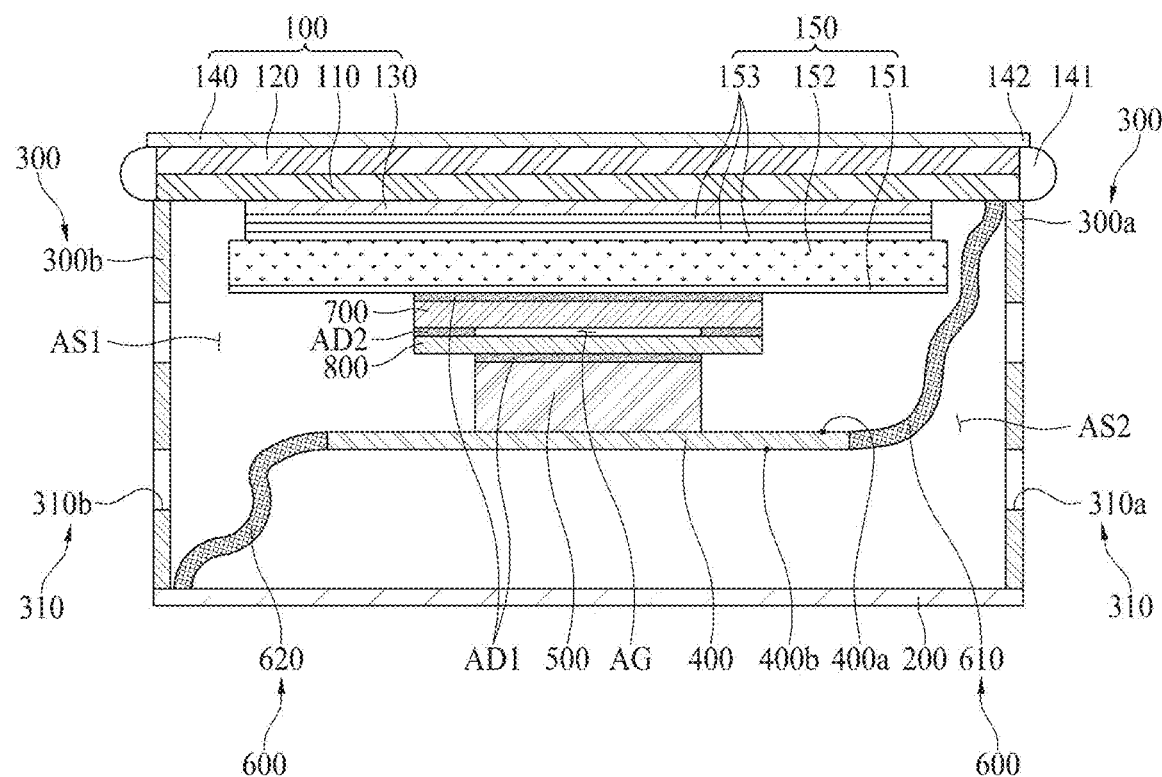
FIG. 5 is a cross-sectional view illustrating another embodiment of a display panel in the display apparatus of FIG. 1.

FIG. 5 is a cross-sectional view illustrating another embodiment of a display panel in the display apparatus of FIG. 1.

For example, a display apparatus illustrated in FIG. 5 may include a display panel 100 implemented as a liquid crystal display (LCD) panel. With reference to the example of FIG. 5, unlike the display apparatus illustrated in the examples of FIGS. 1 to 4, the display apparatus according to an embodiment of the present disclosure may further include a backlight unit 150 between the display panel 100 and the second vibration-generating device 700.

The display panel 110 may include a lower substrate 110, an upper substrate 120, a lower polarization member 130, and an upper polarization member 140. The lower substrate 110, e.g., a thin-film transistor (TFT) array substrate, may include a pixel array including a plurality of pixels respectively in a plurality of pixel areas defined by intersections of a plurality of gate lines and a plurality of data lines. Each of the plurality of pixels may include a TFT connected to a gate line and a data line corresponding thereto, a pixel electrode connected to the TFT, and a common electrode that may be provided adjacent to the pixel electrode, and may be supplied with a common voltage.

According to an embodiment of the present disclosure, the lower substrate 110 may include a pad part in a first edge or periphery thereof and a gate driving circuit in a second edge or periphery thereof. The pad part may provide the pixel array and the gate driving circuit with a signal supplied from the outside. For example, the pad part may include a plurality of data pads connected to the plurality of data lines through a plurality of data link lines, and a plurality of gate pads connected to the gate driving circuit through a gate control signal line.

The gate driving circuit may be embedded (or integrated) into the first edge of the lower substrate 110 to be connected to the plurality of gate lines in a one-to-one relationship. For example, the gate driving circuit may be a shift register including a transistor that may be formed through the same process as a process of forming a TFT provided in each of the pixel areas.

The upper substrate 120, e.g., a color filter array substrate, may include a black matrix that may define an opening area overlapping each of the pixel areas provided on the lower substrate 110 and a color filter provided in the opening area. The upper substrate 120 may be attached to the lower substrate 110, with a liquid crystal layer therebetween, using a sealant. The liquid crystal layer may be between the lower substrate 110 and the upper substrate 120, and may include a liquid crystal, including liquid crystal molecules having an alignment direction that may be changed based on an electric field generated from the common voltage applied to the common electrode and a data voltage applied to the pixel electrode in each of the plurality of pixels.

The lower polarization member 130 may be on a rear surface of the lower substrate 110, and may polarize light, irradiated from the backlight unit 150 onto the lower substrate 110, to a first polarization axis. The upper polarization member 140 may be on a front surface of the upper substrate 120, and may polarize light, discharged to the outside via the upper substrate 120, to a second polarization axis differing from the first polarization axis.

According to an embodiment of the present disclosure, the display panel 100 may further include a sealing member 141. The sealing member 141 may cover three corners and three outer surfaces, other than a first outer surface, of the display panel 100 adjacent to the pad part. The sealing member 141 may reduce or prevent light from leaking through side surfaces of the display panel 110. For example, the sealing member 141 may include a silicon-based sealant or ultraviolet (UV)-curable sealant (or resin), but embodiments are not limited thereto. Considering a process tack time, the sealing member 141 may include the UV-curable sealant. Also, the sealing member 141 may have color (for example, blue, red, bluish-green, or black), but embodiments are not limited thereto. For example, the sealing member 141 may include a colored resin or a light-blocking resin for reducing or preventing leakage of light through a side surface.

A portion of an upper surface of the sealing member 141, according to an embodiment of the present disclosure, may be covered by the upper polarization member 140. For example, the upper polarization member 140 may include an extension portion 142 that may extend in a long direction from an outer surface of the upper substrate 110 to cover a portion of a front surface of the sealing member 141, and may be attached to a portion of the front surface of the sealing member 141. Therefore, a bonding or attaching surface between the sealing member 141 and the upper substrate 110 may be concealed by the extension portion 142 of the upper polarization member 140, and may not be exposed at a forward region, at which a viewer may be located, in front of the display apparatus.

The display panel 100 may drive the liquid crystal layer with an electric field, which may be generated in each of the plurality of pixels using the common voltage and a data voltage applied to a corresponding pixel. Thus, the display panel 100 may display an image using light passing through the liquid crystal layer.

The backlight unit 150 may include a reflective sheet 151, a light guide plate 152, and an optical sheet part 153. The reflective sheet 151 may be configured with a rear surface of the backlight unit 150, and may be connected to the second vibration-generating device 700. For example, the reflective sheet 151 may support the light guide plate 152 on a front surface thereof, and may reflect light incident from the light guide plate 152. For example, the reflective sheet 151 may reduce or prevent the incident from the light guide plate 152 from being discharged to the rear surface of the backlight unit 150, and may increase light discharged to a front surface of the backlight unit 150.

According to an embodiment of the present disclosure, the reflective sheet 151 may receive a vibration of the second vibration-generating device 700, and may transfer the vibration of the second vibration-generating device 700 to the light guide plate 152. For example, the second vibration-generating device 700 may vibrate in a state of contacting a portion of a rear surface of the reflective sheet 151, and may vibrate a whole surface of the reflective sheet 151. A vibration of the reflective sheet 151 may be transferred to the display panel 100 through the backlight unit 150.

The light guide plate 152 may be on the front surface of the reflective sheet 151. For example, the light guide plate 152 may include a light incident surface, and may be on a rear surface of the display panel 100. The light guide plate 152 may change a traveling direction of light, which may be incident through the light incident surface, to a direction toward the display panel 100. According to an embodiment of the present disclosure, the light guide plate 152 may include a light-transmitting plastic or glass material. For example, the light guide plate 152 may include sapphire glass, but embodiments are not limited thereto. For example, the light guide plate 152 may be implemented with glass for light guide.

The optical sheet part 153 may be on a front surface of the light guide plate 152, and may be coupled or connected to the rear surface of the display panel 100. The optical sheet part 153 may enhance a luminance characteristic of light output from the light guide plate 152, and may transfer a vibration of the light guide plate 152 to the display panel 100. According to an embodiment of the present disclosure, the optical sheet part 153 may be configured with a composite optical sheet having a function of diffusing incident light, and a function of collecting diffused light.

According to an embodiment of the present disclosure, the optical sheet part 153 may be on the rear surface of the display panel 100. For example, the optical sheet part 153 may be disposed on (or coupled to) the rear surface of the display panel 100, e.g., through a lamination process. As another example, when the optical sheet part 153 includes one composite optical sheet, a plurality of light collection patterns, including a prism or lenticular pattern, may be additionally on the front surface or the rear surface of the light guide plate 152.

As another example, the rear surface of the optical sheet part 153 may contact a front surface of the light guide plate 152 in an unattached state. For example, the rear surface of the optical sheet part 153 may be disposed on (or supported against) the front surface of the light guide plate 152 to contact the whole front surface of the light guide plate 152 without a separate adhesive member.

According to another embodiment of the present disclosure, the optical sheet part 153 may include first to third optical sheets. The first optical sheet may be a first diffusive sheet including a light scattering particle or a light scattering layer, and may be disposed on the front surface of the light guide plate 152 to primarily scatter or diffuse and output light incident from the light guide plate 152. The second optical sheet may be a second diffusive sheet including a light scattering particle or a light scattering layer, and may be on a front surface of the first optical sheet to secondarily scatter or diffuse and output light incident from the first optical sheet. The third optical sheet may be a prism sheet including a plurality of prism patterns, and may be on a front surface of the second optical sheet to collect, through the plurality of prism patterns, and output light incident from the second optical sheet.

As another example, the second optical sheet may be replaced by a lower prism sheet. According to an embodiment of the present disclosure, the lower prism sheet may include a plurality of lower prism patterns, which may be provided to extend in a long manner in a widthwise-axis direction, and may contact one another in a lengthwise-axis direction. For example, the third optical sheet may be replaced by an upper prism sheet. According to an embodiment of the present disclosure, the upper prism sheet may include a plurality of upper prism patterns, which may be provided to extend in a long manner in a lengthwise-axis direction, and may contact one another in a widthwise-axis direction. Therefore, the lower prism patterns and the upper prism patterns may be disposed to intersect.

For example, the third optical sheet may be on the rear surface of the display panel 100. The second optical sheet may be attached to a whole rear surface of the third optical sheet by a second sheet adhesive member. The first optical sheet may be attached to a whole rear surface of the second optical sheet by a first sheet adhesive member. According to an embodiment of the present disclosure, each of the first and second sheet adhesive members may be an optical adhesive member or an optical adhesive film, but embodiments are not limited thereto. For example, each of the first and second sheet adhesive members may be a pressure sensitive adhesive (PSA), an optical clear adhesive (OCA), or an optical clear resin (OCR).

Therefore, the display apparatus may vibrate the display panel 100, without decreasing a sound pressure level generated by a multi-layer structure between the backlight unit 150 and the display panel 100 in a vibration transfer process. Thus, the display apparatus may allow a position of an image displayed by the display apparatus to match a position of a sound output from the display apparatus, thereby enhancing an immersion experience of a viewer who may be viewing the image displayed by the display apparatus.

Figure 6:
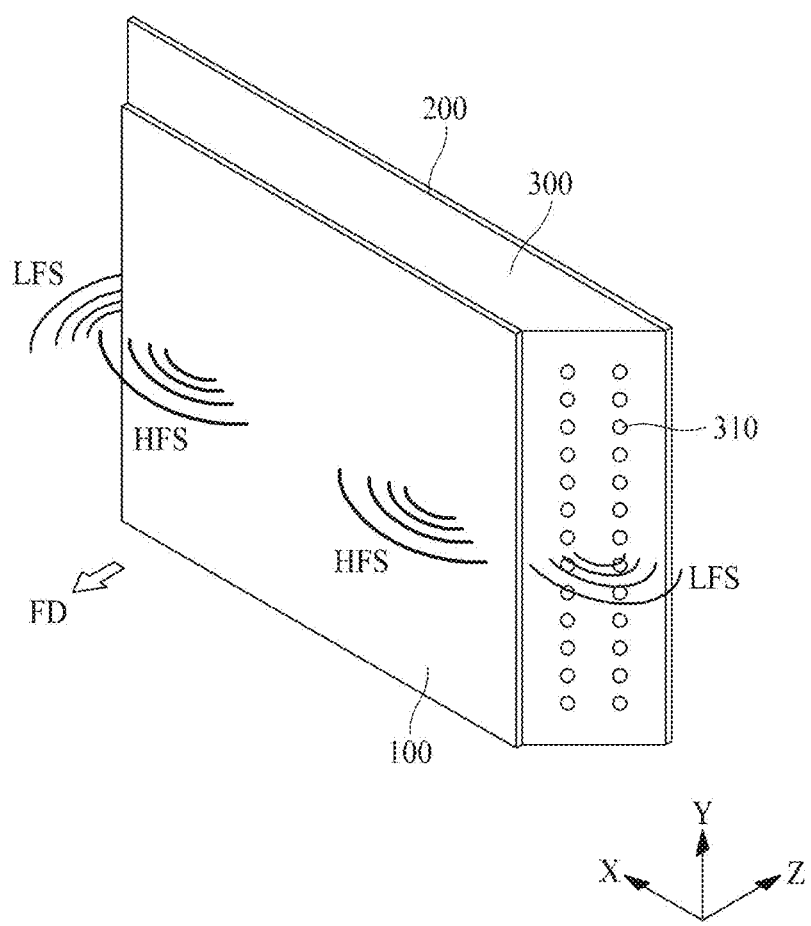
FIG. 6 is a perspective view of a display apparatus according to another embodiment of the present disclosure.
Figure 7:
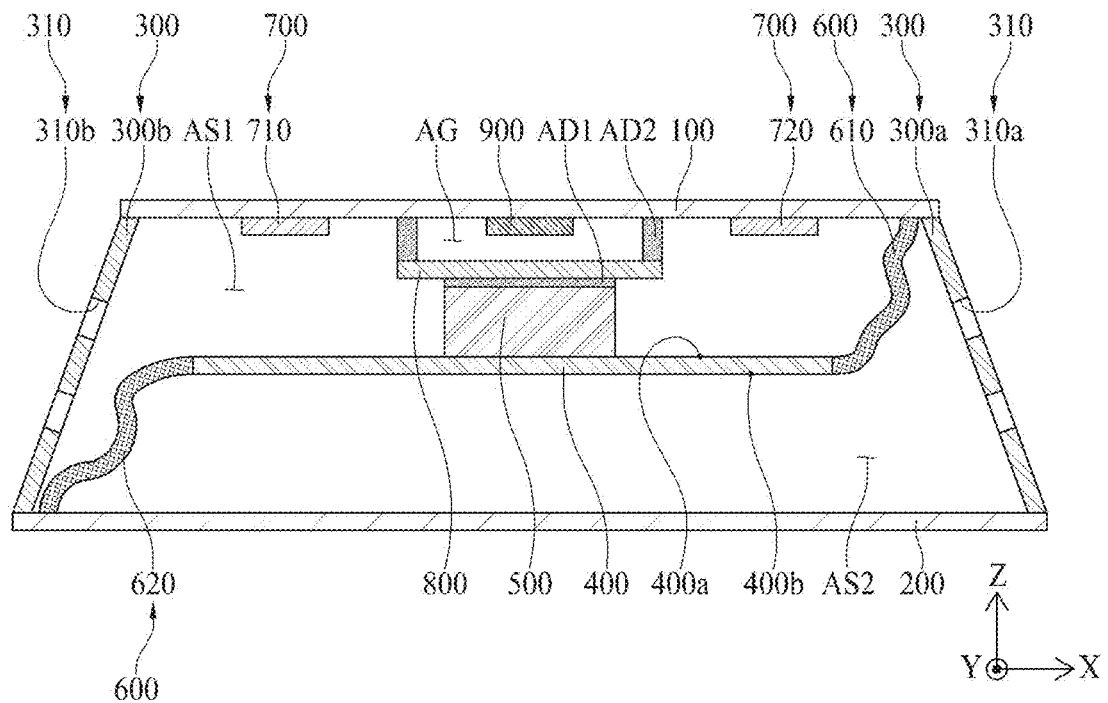
FIG. 7 is a cross-sectional view of the display apparatus of FIG. 6.
Figure 8:
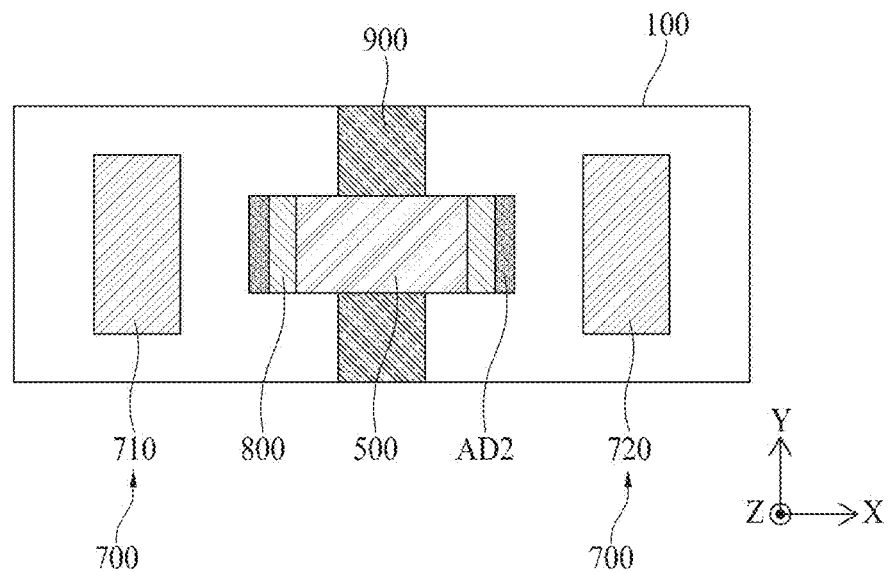
FIG. 8 is a rear view of the display apparatus of FIG. 6.
Figure 9:
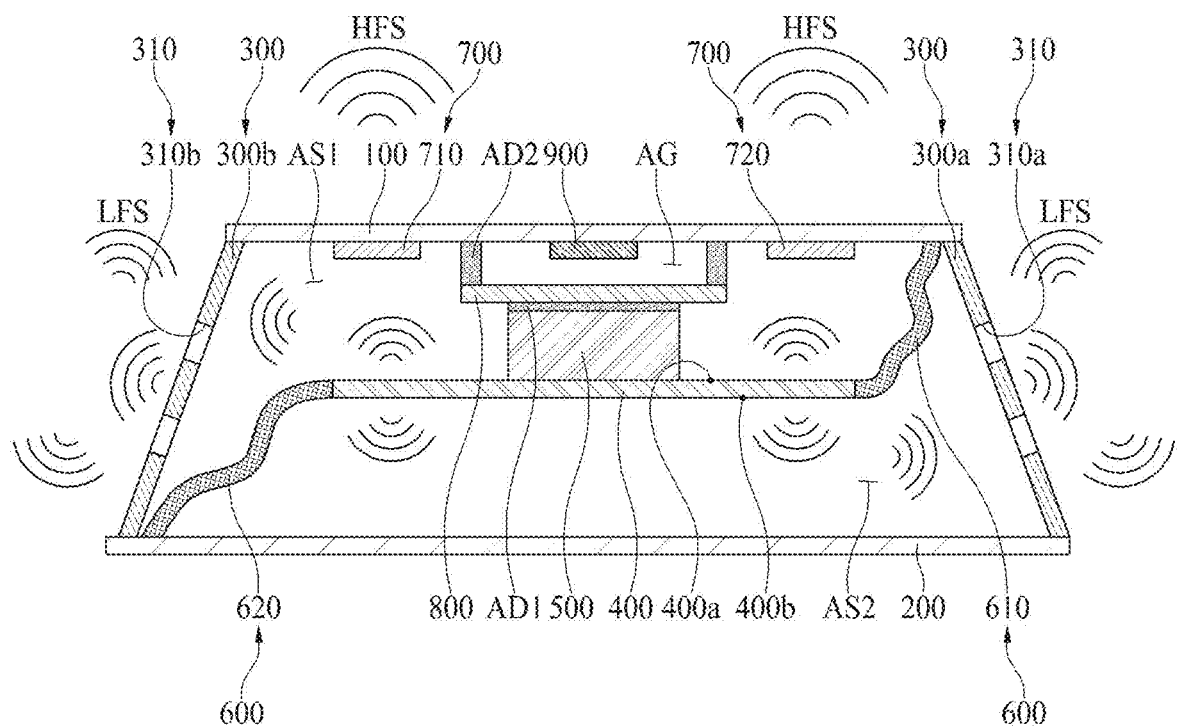
FIG. 9 is a diagram illustrating a path through which a sound of each of a high-pitched sound range and a low-pitched sound range may be output in the display apparatus of FIG. 6.

FIG. 6 is a perspective view of a display apparatus according to another embodiment of the present disclosure. FIG. 7 is a cross-sectional view of the display apparatus of FIG. 6. FIG. 8 is a rear view of the display apparatus of FIG. 6. FIG. 9 is a diagram illustrating a path through which a sound of each of a high-pitched sound range and a low-pitched sound range may be output in the display apparatus of FIG. 6.

Hereinafter, the same elements as the elements illustrated in the examples of FIGS. 1 to 4 according to the present disclosure will be briefly described or will not be described. With reference to the examples of FIGS. 6 to 9, the display apparatus may include a display panel 100, a rear structure 200, a second structure 300, a vibration plate 400, a first vibration-generating device 500, a separation part 600, a second vibration-generating device 700, a reinforcement plate 800, and a vibration absorption member 900.

The display panel 100 may display an image, and may be implemented as any type of display panel, such as a liquid crystal display panel, an organic light-emitting diode (OLED) display panel, a micro light-emitting diode display panel, and an electroluminescent display panel, etc. The display panel 100 may vibrate according to a vibration of the vibration generation device 700 to output sound.

The rear structure 200 may be on a first surface of the vibration plate 400 to support the display panel 100. According to an embodiment of the present disclosure, the rear structure 200 may be on a rear surface (or first surface) of each of the display panel 100 and the vibration plate 400 to support the display panel 100.

The second structure 300 may be between an edge or periphery of the display panel 100 and an edge or periphery of the rear structure 200, and may connect the display panel 100 to the rear structure 200. According to an embodiment of the present disclosure, the second structure 300 may surround all surfaces of the display apparatus, other than a front surface (or second surface) with the display panel 100 disposed thereon and a rear surface with the rear structure 200 disposed thereon. Accordingly, the second structure 300 may be used as a housing of the display apparatus, along with the rear structure 200.

According to an embodiment of the present disclosure, the rear structure 200 may cover a whole rear surface (or first surface) of the display panel 100 spaced apart therefrom, and may have an area that may be greater than that of the display panel 100. Therefore, the second structure 300 connecting the edge or periphery of the display panel 100 to the edge or periphery of the rear structure 200 may be disposed to be inclined from a vertical direction of the display panel 100. For example, the second structure 300 may face a forward diagonal direction of the display apparatus.

The second structure 300 may include at least one hole 310 through which a vibration generated by the first vibration-generating device 500 may be discharged to the outside. For example, when the second structure 300 faces the forward diagonal direction of the display apparatus, the at least one hole 310 may be formed (e.g., bored) in the forward diagonal direction of the display apparatus.

According to an embodiment of the present disclosure, the second structure 300 may include a first hole 310a and a second hole 310b. The first hole 310a may be connected to a second air space AS2 facing a second surface 400b of the vibration plate 400, and may be disposed on a first portion 300a of the second structure 300. The second hole 310b may be connected to a first air space AS1 facing a first surface 400a of the vibration plate 400, and may be disposed on a second portion 300b of the second structure 300. As illustrated in FIG. 9, a low-frequency sound LFS generated from the first surface 400a of the vibration plate 400 may pass through the first air space AS1, and may be discharged in a diagonal direction of the second portion of the display apparatus through the second hole 310b in the second portion 300b of the second structure 300. Also, a low-frequency sound LFS generated from the second surface 400b of the vibration plate 400 may pass through the second air space AS2, and may be discharged to in a diagonal direction of the first portion 300a of the display apparatus through the first hole 310a in the first portion 300a of the second structure 300.

A display apparatus according to a second embodiment of the present disclosure may include the second structure 300, which may be disposed in a forward diagonal direction of the display apparatus. Thus, the display apparatus according to a second embodiment may more easily output a low-frequency sound LFS generated by the vibration plate 400 toward a forward region FD in front direction of the display panel 100 than in a first embodiment including a second structure 200, which may be disposed in a lateral direction of the display apparatus.

Moreover, the first and second air spaces AS1 and AS2 may be separated from each other by the separation part 600. Thus, the display apparatus may discharge low-frequency sound LFS, generated from the first surface 400a and the second surface 400b of the vibration plate 400, through the second hole 310b and the first hole 310a. Therefore, the display apparatus may reduce or prevent the low-frequency sound LFS, generated from the first surface 400a and the second surface 400b of the vibration plate 400, from being offset therebetween, and may enhance a sound pressure level (SPL) of each of the low-frequency sound LFS discharged to both sides of the display apparatus.

The vibration plate 400 may be on the first surface of the display panel 100. The vibration plate 400 may be between the display panel 100 and the rear structure 200, and may vibrate by the first vibration-generating device 500. According to an embodiment of the present disclosure, the vibration plate 400 may vibrate the first air space AS1 facing the first surface 400a of the vibration plate 400, and may vibrate the second air space AS2 facing the second surface 400b of the vibration plate 400, opposite to the first surface 400a. The display apparatus according to an embodiment of the present disclosure may use, instead of the display panel 100, the vibration plate 400 as a vibration plate of the low-frequency domain having a large vibration displacement, thereby securing a sound output characteristic of the low-frequency domain, and providing a high-quality image.

The first vibration-generating device 500 may be on the first surface of the display panel 100, and may vibrate the vibration plate 400. According to an embodiment of the present disclosure, the first vibration-generating device 500 may be between the display panel 100 and the vibration plate 400 to vibrate, and may transfer the vibration to each of the first and second air spaces AS1 and AS2 through the vibration plate 400. Also, the low-frequency sound LFS output from a diagonal direction of each of both sides or portions of the display apparatus may be provided toward a forward region in front of the display apparatus and a rearward region behind the display apparatus. Accordingly, the display apparatus may output the low-frequency sound LFS toward the forward region in front of the display apparatus using the vibration plate 400 as a vibration plate of the low-frequency domain. Thus, a position of an image displayed by the display apparatus may match a position of a sound generated by the display apparatus, thereby enhancing an immersion experience of a viewer who may be viewing the image displayed by the display apparatus.

According to an embodiment of the present disclosure, the first vibration-generating device 500 may be a speaker, and for example, may be a sound actuator, a sound exciter, or a piezoelectric element, but embodiments are not limited thereto. For example, the first vibration-generating device 500 may be a sound device for outputting sound according to an electrical signal.

The separation part 600 may be connected to the vibration plate 400, and may separate a space, facing the first surface 400a of the vibration plate 400, from a space facing the second surface 400b opposite to the first surface of the vibration plate 400. According to an embodiment of the present disclosure, the separation part 600 may include a first separation part 610 and a second separation part 620.

The first separation part 610 may connect a first portion (for example, a right portion) of the vibration plate 400 to a first portion (for example, a right portion) of the display panel 100, and the second separation part 620 may connect a second portion (for example, a left portion) opposite to first portion of the vibration plate 400 to a second portion (for example, a left portion) opposite to first portion of the rear structure 200. It should be appreciated that the terms "left" and "right" are used herein for convenience, and are interchangeable, as should be understood to one of ordinary skill in the art. For example, the first and second separation parts 610 and 620 may separate the space AS1, facing the first surface 400a of the vibration plate 400, from a space between the first portion (for example, a right portion) of the display panel 100 and the first portion (for example, a right portion) of the rear structure 200. Also, the first and second separation parts 610 and 620 may separate the space AS2, facing the second surface 400b of the vibration plate 400, from a space between the second portion (for example, a left portion) of the display panel 100 and the second portion (for example, a left portion) of the rear structure 200. Accordingly, the display panel 100, the separation part 600, the vibration plate 400, and the second portion 300b of the second structure 300 may surround the first air space AS1; and the rear structure 200, the separation part 600, the vibration plate 400, and the first portion 300a of the second structure 300 may surround the second air space AS2.

Therefore, the separation part 600 may separate the first and second air spaces AS1 and AS2 so that the low-frequency sound LFS of the first air space AS1 may be discharged through the second hole 310b of the second portion 300b of the second structure 300, and the low-frequency sound LFS of the second air space AS2 may be discharged through the first hole 310a of the first portion 300a of the second structure 300. Accordingly, when the display apparatus according to an embodiment of the present disclosure includes the separation part 600 for separating the first and second air spaces AS1 and AS2, vibrations or sounds generated from the first surface 400a and the second surface 400b of the vibration plate 400 may be reduced or prevented from being offset therebetween, and a sound pressure level (SPL) of each of the low-frequency sound LFS may be enhanced.

The separation part 600 may include a material having a good heat resistance, and thus, may maintain good mechanical physical properties in an extensive or high temperature. Also, the separation part 600 may include a material having high stiffness, high elasticity, and flexibility, and thus, may separate the first and second air spaces AS1 and AS2 without hindering the vibration or sound of the vibration plate 400. For example, the separation part 600 may include a polyimide fabric or a polyimide film, but embodiments are not limited thereto.

The second vibration-generating device 700 may be on the first surface of the display panel 100 to vibrate the display panel 100. According to an embodiment of the present disclosure, the second vibration-generating device 700 may be attached to the rear surface of the display panel 100 by a first adhesive member AD1, and may vibrate the display panel 100 to output a high-frequency (or a high-pitched sound range) sound HFS toward a forward region FD in front of the display panel 100. For example, the first vibration-generating device 500 may generate the low-frequency sound LFS using the vibration plate 400 as a vibration plate, and the second vibration-generating device 700 may generate the high-frequency sound HFS using the display panel 100 as a vibration plate.

The second vibration-generating device 700 may include a plurality of sound generating modules, which may respectively vibrate a plurality of regions of the display panel 100. According to an embodiment of the present disclosure, the second vibration-generating device 700 may include first and second sound generating modules 710 and 720, which may respectively vibrate a left region and a right region of the display panel 100. For example, the first and second sound generating modules 710 and 720 may be spaced apart from each other on the rear surface of the display panel 100. Therefore, the first sound generating module 710 may be disposed on a left portion of the rear surface of the display panel 100 to vibrate the left region of the display panel 100, and the second sound generating module 720 may be disposed on a right portion of the rear surface of the display panel 100 to vibrate the right region of the display panel 100. The first and second sound generating modules 710 and 720 may receive different vibration signals, and may be independently driven. For example, the first sound generating module 710 may generate a sound using the left region of the display panel 100 as a vibration plate, and the second sound generating module 720 may generate a sound using the right region of the display panel 100 as a vibration plate.

The reinforcement plate 800 may be between the display panel 100 and the first vibration-generating device 500. The reinforcement plate 800 may be on a first surface of the first vibration-generating device 500 facing the display panel 100, e.g., using the first adhesive member AD1.

The display apparatus according to an embodiment of the present disclosure may further include a second adhesive member AD2, which may be disposed between an edge or periphery of the reinforcement plate 800 and the display panel 100, and may attach the reinforcement plate 800 to the display panel 100. Therefore, the display apparatus may further include an air gap AG surrounded by the reinforcement plate 800, the display panel 100, the vibration absorption member 900, and the second adhesive member AD2. The air gap AG may be provided in a space between the display panel 100 and the reinforcement plate 800 overlapping the first vibration-generating device 500. Thus, a vibration or a sound of the low-frequency domain generated by the first vibration-generating device 500 may be reduced or prevented from being transferred to the display panel 100.

According to an embodiment of the present disclosure, the display apparatus may determine a first resonance frequency, based on a mass of the first vibration-generating device 500, a material and a thickness of the reinforcement plate 800, and a deflection value set based on a position of a supporting point or portion that may support the reinforcement plate 800. For example, the second adhesive member AD2, between an edge or periphery of the reinforcement plate 800 and the display panel 100, may be used as the supporting point or portion that supports the reinforcement plate 800. Accordingly, the second adhesive member AD2 may support the edge or periphery of the reinforcement plate 800, and thus, may form the air gap AG between the reinforcement plate 800 and the display panel 100, and may set a deflection value corresponding to the reinforcement plate 800 for setting the first resonance frequency.

According to an embodiment of the present disclosure, the display apparatus may determine a second resonance frequency, based on a mass of an equivalent module on the display panel 100, a material and a thickness of the display panel 100, and a deflection value set based on a position of a supporting point or portion that supports the display panel 100. For example, the equivalent module on the display panel 100 may correspond to one module having the same characteristic as that of a module implemented by coupling or connecting the vibration absorption member 900, the second adhesive member AD2, the reinforcement plate 800, and the first vibration-generating device 500. Also, the second structure 300 may be used as a supporting point or portion that supports the display panel 100. Accordingly, the second structure 300 may support the edge or periphery of the display panel 100, and thus, may be used as a housing of the display apparatus, and may determine a deflection value corresponding to the display panel 100 for setting the second resonance frequency.

For example, a first resonance frequency 'f' corresponding to the reinforcement plate 800 and a second resonance frequency 'f' corresponding to the display panel 100 may each be determined based on a deflection value 'δ' as in the Equation below, which is the same as the Equation above.

$$f = \frac{1}{2\pi}\left(\frac{g}{\delta}\right)^{0.5} \quad \text{[Equation]}$$

For example, 'g' denotes an acceleration of gravity (for example, 9.81 m/s$^2$), and 'δ' denotes a deflection value corresponding to the reinforcement plate 800 or the display panel 100. For example, when the deflection value 'δ' increases, the resonance frequency 'f' may decrease, and when the deflection value 'δ' decreases, the resonance frequency 'f' may increase. Therefore, the first resonance frequency may be set based on a mass of the first vibration-generating device 500, a material and a thickness of the reinforcement plate 800, and a deflection value determined based on a position of a supporting point or portion that supports the reinforcement plate 800; and the second resonance frequency may be set based on a mass of an equivalent module on the display panel 100, a material and a thickness of the display panel 100, and a deflection value determined based on a position of a supporting point or portion that supports the display panel 100.

According to an embodiment of the present disclosure, the display apparatus may identically set the first resonance frequency 'f' corresponding to the reinforcement plate 800 and the second resonance frequency 'f' corresponding to the display panel 100. Thus, the display apparatus may allow a vibration of the reinforcement plate 800 to overlap a vibration of the display panel 100, thereby enhancing a sound pressure level in a corresponding frequency domain.

According to another embodiment of the present disclosure, the display apparatus may set the first resonance frequency 'f' corresponding to the reinforcement plate 800 to a frequency that is 'n' (where 'n' is a natural number greater than or equal to two) times the second resonance frequency 'f' corresponding to the display panel 100. Thus, the display apparatus may allow the vibration of the reinforcement plate 800 to overlap the vibration of the display panel 100, thereby enhancing a sound pressure level in a corresponding frequency domain.

Therefore, the display apparatus may identically set the first resonance frequency 'f' corresponding to the reinforcement plate 800 and the second resonance frequency 'f' corresponding to the display panel 100, or may set the first resonance frequency 'f' corresponding to the reinforcement plate 800 to a frequency that is 'n' times the second resonance frequency 'f' corresponding to the display panel 100. Thus, the display apparatus may amplify the vibration of the reinforcement plate 800 and the vibration of the display panel 100, thereby enhancing a sound output characteristic in a low-pitched sound range.

According to an embodiment of the present disclosure, the display apparatus may adjust a resonance frequency having a haptic function, based on the first resonance frequency 'f' corresponding to the reinforcement plate 800 and the second resonance frequency 'f' corresponding to the display panel 100. The reinforcement plate 800 may be used as a vibration plate corresponding to a low-frequency domain, and the display panel 100 may be used as a vibration plate corresponding to a high frequency domain, whereby the reinforcement plate 800 may have the haptic function. For example, the display apparatus may identically set the first resonance frequency 'f' corresponding to the reinforcement plate 800 and the second resonance frequency 'f' corresponding to the display panel 100, or may set the first resonance frequency 'f' corresponding to the reinforcement plate 800 to a frequency that is 'n' times the second resonance frequency 'f' corresponding to the display panel 100. Thus, the display apparatus may apply the haptic function for providing a user with a feedback that may transfer a touch sensation.

The vibration absorption member 900 may be on the first surface of the display panel 100, and may be spaced apart from the reinforcement plate 800. According to an embodiment of the present disclosure, a front surface of the vibration absorption member 900 may be on the rear surface (or the first surface) of the display panel 100, and a rear surface of the vibration absorption member 900 may be spaced apart from the front surface of the reinforcement plate 800, and may face the front surface of the reinforcement plate 800. Also, the vibration absorption member 900 may divide a plurality of regions of the display panel 100 where the plurality of sound generating modules may be respectively disposed. According to an embodiment of the present disclosure, the vibration absorption member 900 may divide the left region and the right region of the display panel 100, where the first and second sound generating modules 710 and 720 are respectively disposed. Also, the vibration absorption member 900 may absorb vibrations generated by the first and second sound generating modules 710 and 720. Therefore, the vibration absorption member 900 may reduce or prevent leakage of sounds generated by the first and second sound generating modules 710 and 720, and may output sound HFS of a high-pitched sound region toward only a forward region FD in front direction of the display panel 100, thereby enhancing a sound output characteristic.

Figure 10:
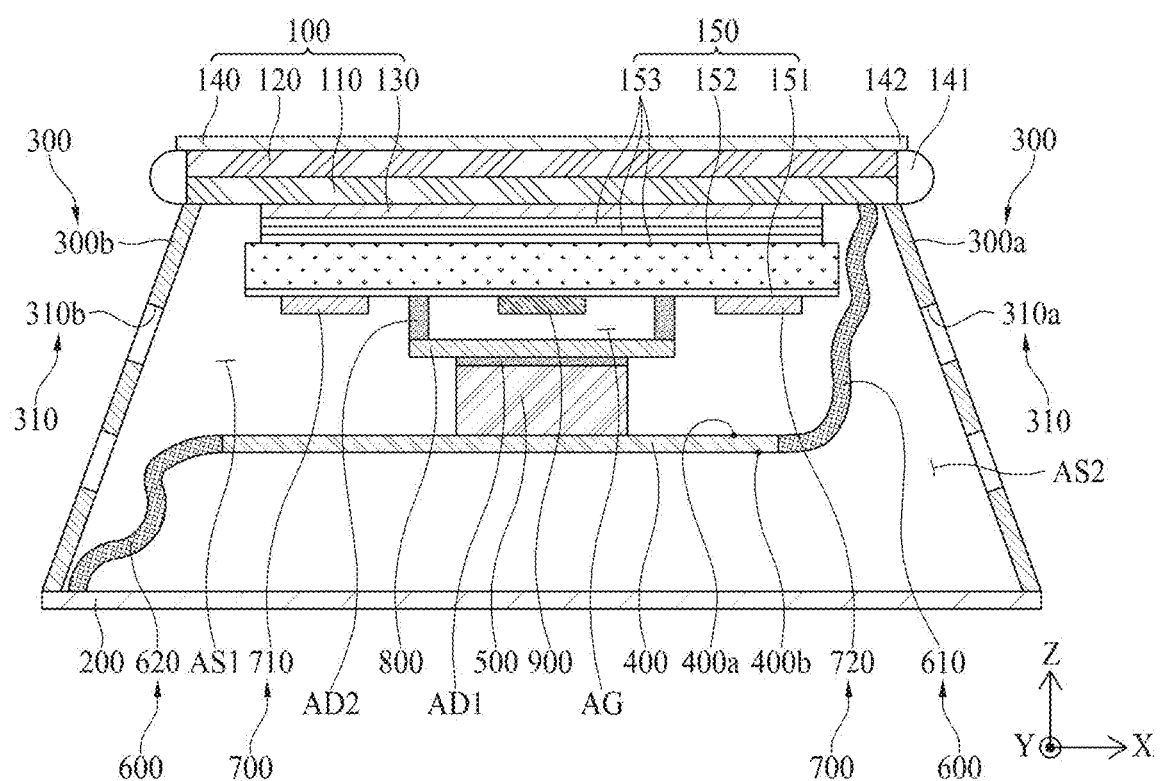
FIG. 10 is a cross-sectional view illustrating another embodiment of a display panel in the display apparatus of FIG. 6.

FIG. 10 is a cross-sectional view illustrating another embodiment of a display panel in the display apparatus of FIG. 6.

For example, a display apparatus illustrated in FIG. 10 may include a display panel 100 implemented as an LCD panel. With reference to the example of FIG. 10, unlike the display apparatus illustrated in the examples of FIGS. 6 to 9, the display apparatus according to an embodiment of the present disclosure may further include a backlight unit 150 on a rear surface of the display panel 100.

The display panel 110 may include a lower substrate 110, an upper substrate 120, a lower polarization member 130, and an upper polarization member 140. The lower substrate 110, e.g., a thin-film transistor (TFT) array substrate, may include a pixel array including a plurality of pixels respectively provided in a plurality of pixel areas defined by intersections of a plurality of gate lines and a plurality of data lines. Each of the plurality of pixels may include a TFT connected to a gate line and a data line corresponding thereto, a pixel electrode connected to the TFT, and a common electrode provided adjacent to the pixel electrode and supplied with a common voltage.

The upper substrate 120, a color filter array substrate, may include a black matrix that may define an opening area overlapping each of the pixel areas provided on the lower substrate 110 and a color filter provided in the opening area. The upper substrate 120 may be attached to the lower substrate 110, with a liquid crystal layer therebetween, e.g., using a sealant. The liquid crystal layer may be between the lower substrate 110 and the upper substrate 120, and may include a liquid crystal including liquid crystal molecules having an alignment direction that may be changed based on an electric field generated from the common voltage applied to the common electrode and a data voltage applied to the pixel electrode in each of the plurality of pixels.

The lower polarization member 130 may be on a rear surface of the lower substrate 110, and may polarize light, irradiated from the backlight unit 150 onto the lower substrate 110, to a first polarization axis. The upper polarization member 140 may be on a front surface of the upper substrate 120, and may polarize light, discharged to the outside via the upper substrate 120, to a second polarization axis differing from the first polarization axis.

According to an embodiment of the present disclosure, the display panel 100 may further include a sealing member 141. The sealing member 141 may cover three corners and three outer surfaces, other than a first outer surface, of the display panel 100 adjacent to the pad part. The sealing member 141 may reduce or prevent light from leaking through side surfaces of the display panel 110.

A portion of an upper surface of the sealing member 141 according to an embodiment of the present disclosure may be covered by the upper polarization member 140. For example, the upper polarization member 140 may include an extension portion 142, which may extend in a long direction from an outer surface of the upper substrate 110 to cover a portion of a front surface of the sealing member 141, and may be attached to a portion of the front surface of the sealing member 141. Therefore, a bonding or attaching surface between the sealing member 141 and the upper substrate 110 may be concealed by the extension portion 142 of the upper polarization member 140, and may not be exposed at a forward region, at which a viewer may be located, in front of the display apparatus.

The display panel 100 may drive the liquid crystal layer with an electric field, which may be generated in each of the plurality of pixels using the common voltage and a data voltage applied to a corresponding pixel. Thus, the display panel 100 may display an image using light passing through the liquid crystal layer.

The backlight unit 150 may include a reflective sheet 151, a light guide plate 152, and an optical sheet part 153. The reflective sheet 151 may be configured with a rear surface of the backlight unit 150, and may be connected to the second vibration-generating device 700. For example, the reflective sheet 151 may support the light guide plate 152 on a front surface thereof, and may reflect light incident from the light guide plate 152. For example, the reflective sheet 151 may reduce or prevent the incident from the light guide plate 152 from being discharged to the rear surface of the backlight unit 150, and may increase light discharged to a front surface of the backlight unit 150.

According to an embodiment of the present disclosure, the reflective sheet 151 may receive a vibration of the second vibration-generating device 700, and may transfer the vibration of the second vibration-generating device 700 to the light guide plate 152. For example, the second vibration-generating device 700 may vibrate in a state of contacting a portion of a rear surface of the reflective sheet 151, and may vibrate a whole surface of the reflective sheet 151. A vibration of the reflective sheet 151 may be transferred to the display panel 100 through the backlight unit 150.

The light guide plate 152 may be on the front surface of the reflective sheet 151. For example, the light guide plate 152 may include a light incident surface, and may be on a rear surface of the display panel 100. The light guide plate 152 may change a traveling direction of light, which may be incident through the light incident surface, to be a direction toward the display panel 100.

The optical sheet part 153 may be on a front surface of the light guide plate 152, and may be coupled or connected to the rear surface of the display panel 100. The optical sheet part 153 may enhance a luminance characteristic of light output from the light guide plate 152, and may transfer a vibration of the light guide plate 152 to the display panel 100. According to an embodiment of the present disclosure, the optical sheet part 153 may be configured with a composite optical sheet having a function of diffusing incident light, and a function of collecting diffused light.

Figure 11:
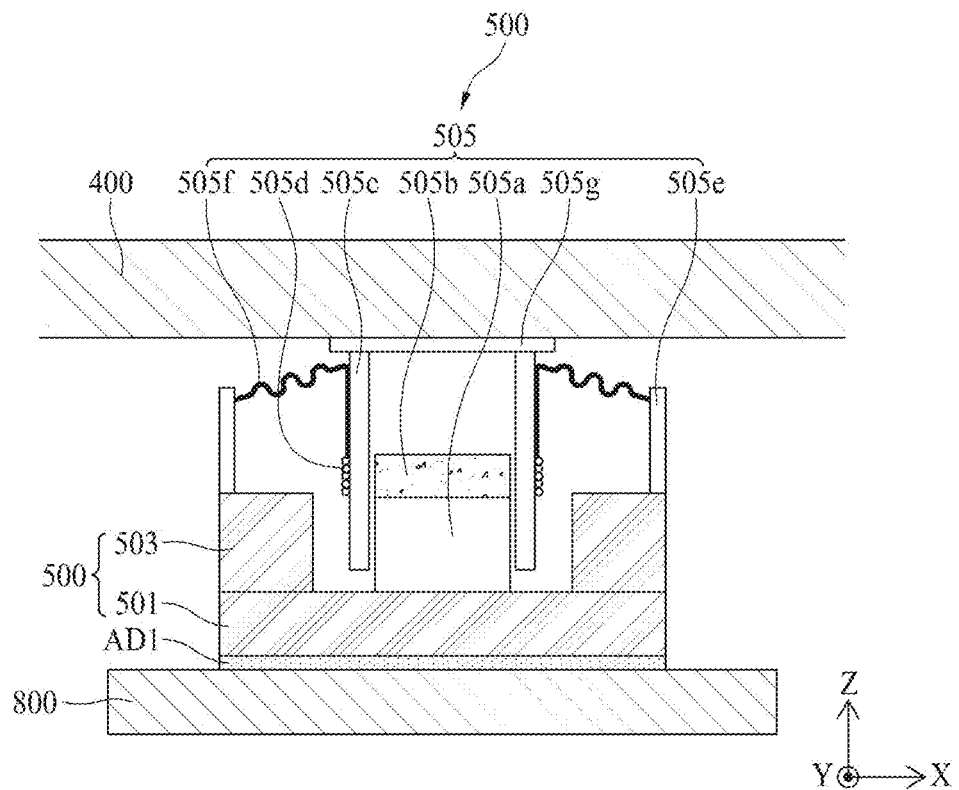
FIG. 11 is a cross-sectional view illustrating a first vibration-generating device in a display apparatus according to an embodiment of the present disclosure.

FIG. 11 is a cross-sectional view illustrating a first vibration-generating device in a display apparatus according to an embodiment of the present disclosure.

With reference to FIG. 11, a first vibration-generating device 500 may include a module frame 501, a side frame 503, and a vibration unit 505. The module frame 501 may be attached to a reinforcement plate 800 by a first adhesive member AD1, and may support the first vibration-generating device 500. For example, the module frame 501 may support the side frame 503 and the magnet member 505*a*. The module frame 501 may be used as a lower plate, which may be disposed under the magnet member 505*a*. Therefore, the first vibration-generating device 500 may not include a separate lower plate; and the upper plate 505*b* and the module frame 501 may be on and under the magnet member 505*a*, and may increase a magnetic flux density generated through the magnet member 505*a*.

The side frame 503 may be on the module frame 501, and may surround a lower portion of the vibration unit 505 spaced apart therefrom. For example, the side frame 503 may surround the magnet member 505*a* spaced apart therefrom, and thus, may allow a magnetic flux generated by the magnet member 505*a* from concentrating on the inside of the vibration unit 505, thereby reducing or preventing leakage of the magnetic flux. Therefore, the upper plate 505*b* may be on an upper portion of the magnet member 505*a*, the module frame 501 may be on a lower portion of the magnet member 505*a*, and the side frame 503 may surround a side surface of the magnet member 505*a* spaced apart therefrom, thereby reducing or preventing leakage of the magnetic flux generated by the magnet member 505*a* to increase the magnetic flux and enhance a vibration characteristic.

The vibration unit 505 may be on the module frame 501 to vibrate the vibration plate 400. For example, using the module frame 501 as a supporter, the vibration unit 505 may vibrate the vibration plate 400 according to a vibration signal corresponding to a sound signal associated with an image.

The vibration unit 505 may include a magnet member 505*a*, the upper plate 505*b*, a bobbin 505*c*, a coil 505*d*, an external frame 505*e*, a damper 505*f*, and a bobbin ring 505*g*. The magnet member 505*a* may be on the module frame 501. For example, the magnet member 505*a* may be between the upper plate 505*b* and the module frame 501, and may be surrounded by the side frame 503 spaced apart therefrom. According to an embodiment of the present disclosure, the upper plate 505*b* may be on one portion of the magnet member 505*a*, and the module frame 501 may be on the other portion opposite the one portion, and the upper plate 505*b* and the module frame 501 may control the magnetic flux generated by the magnet member 505*a*. Accordingly, the magnet member 505*a* may be between the upper plate 505*b* and the module frame 501. Thus, the magnetic flux generated by the magnet member 505*a* may concentrate on the inside of the vibration unit 505, thereby reducing or preventing leakage of the magnetic flux.

The upper plate 505*b* may be on an upper portion of the magnet member 505*a*, and may be spaced apart from the vibration plate 400. Also, the magnet member 505*a* and the upper plate 505*b* may be inserted or accommodated into the bobbin 505*c* having a cylindrical shape. Thus, an outer circumference surface of each of the magnet member 505*a* and the upper plate 505*b* may be surrounded by the bobbin 505*c*. Accordingly, the magnet member 505*a* and the upper plate 505*b* may guide a rectilinear reciprocating motion of the bobbin 505*c*.

The bobbin 505*c* may surround the upper plate 505*b*, and may be on the vibration plate 400 through the bobbin ring 505*g*. For example, the bobbin 505*c* may surround the magnet member 505*a* and the upper plate 505*b*, and may be surrounded by the side frame 503 spaced apart therefrom. For example, when a magnetic field is generated in the vibration unit 505 with a sound-generating current applied to the coil 505d wound around an outer circumference surface of the bobbin 505c, the bobbin 505c may vibrate the vibration plate with the magnetic field using the bobbin ring 505g. Therefore, a front surface of the bobbin 505c may contact the bobbin ring 505g, and the bobbin 505c may vibrate the vibration plate 400 through the bobbin ring 505g according to whether a current is applied thereto or not.

The coil 505d may be wound around the outer circumference surface of the bobbin 505c, and may surround the magnet member 505a spaced apart therefrom. For example, the coil 505d may be wound around the outer circumference surface of the bobbin 505c, may surround the magnet member 505a spaced apart therefrom, and may be supplied with the sound-generating current. For example, the coil 505d may be referred to as a "voice coil." When the sound-generating current is applied to the coil 505d, the bobbin 505c may move through guiding by the damper 505f according to Fleming's Left-Hand Rule for Motors, based on an external magnetic field generated around the magnet member 505a and an application magnetic field generated around the coil 505d. For example, a magnetic flux generated from a magnetic field may flow along a closed loop, which may be formed by a connection of the coil 505d, the side frame 503, the module frame 501, the magnet member 505a, the upper plate 505b, and the coil 505d. Therefore, the bobbin 505c may vibrate while being guided by the damper 505f, and may transfer the vibration to the vibration plate 400.

The external frame 505e may be on the side frame 503. For example, the external frame 505e may extend from an outer portion of an upper portion of the side frame 503 to the vibration plate 400. Also, the external frame 505e may be spaced apart from the bobbin 505c in parallel with the bobbin 505c. An upper portion of the external frame 505e may be connected to the damper 505f, and may support one portion of the damper 505f. Accordingly, the other portion of the damper 505f may be connected to the bobbin 505c, and while the damper 505f is guiding a vibration of the bobbin 505c, the external frame 505e may be fixed to an upper portion of the side frame 503, and may support one portion of the damper 505f.

The damper 505f may be between the external frame 505e and the bobbin 505c, and may guide the vibration of the bobbin 505c. For example, the one portion of the damper 505f may be connected to an upper portion of the external frame 505e, and the other portion of the damper 505f may be connected to the bobbin 505c. The damper 505f may have a structure that may be creased between the one portion and the other portion of the damper 505f, and may be contracted and relaxed based on a rectilinear reciprocating motion of the bobbin 505c to control and guide the vibration of the bobbin 505c. Therefore, the damper 505f may be connected between the external frame 505e and the bobbin 505c, and thus, may limit or adjust a vibration distance of the bobbin 505c using a restoring force of the damper 505f. For example, when the bobbin 505c vibrates by a certain distance or more, or vibrates by a certain distance or less, the bobbin 505c may be restored to an original position by the restoring force of the damper 505f.

The bobbin ring 505g may be between the bobbin 505c and the vibration plate 400, and may transfer the vibration of the bobbin 505c to the vibration plate 400. Also, the bobbin ring 505g may attach the bobbin 505c to the vibration plate 400. For example, the bobbin ring 505g may be implemented with a double-sided tape, but embodiments are not limited thereto.

Figure 12:
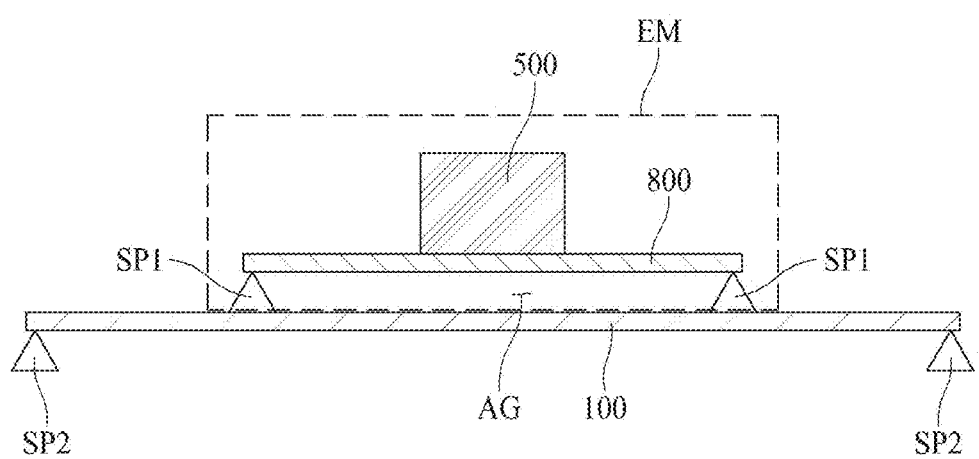
FIG. 12 is a diagram for describing the principle of resonance frequency modeling by a display panel, a reinforcement plate, and a first vibration-generating device in a display apparatus according to an embodiment of the present disclosure.

FIG. 12 is a diagram for describing the principle of resonance frequency modeling by a display panel, a reinforcement plate, and a first vibration-generating device in a display apparatus according to an embodiment of the present disclosure.

With reference to FIG. 12, the display apparatus may determine a first resonance frequency, based on a mass of a first vibration-generating device 500, a material and a thickness of a reinforcement plate 800, and a deflection value determined based on a position of a supporting point or portion SP1 that supports the reinforcement plate 800. For example, the second adhesive member AD2 disposed between an edge or periphery of the reinforcement plate 800 and an edge or periphery of the second vibration-generating device 700 may be used as the supporting point or portion SP1 that supports the reinforcement plate 800. Accordingly, the second adhesive member AD2 may support the edge or periphery of the reinforcement plate 800, and thus, may form an air gap AG between the reinforcement plate 800 and the second vibration-generating device 700, and may determine a deflection value corresponding to the reinforcement plate 800 for setting the first resonance frequency.

According to an embodiment of the present disclosure, the display apparatus may determine a second resonance frequency, based on a mass of an equivalent module EM on the display panel 100, a material and a thickness of the display panel 100, and a deflection value determined based on a position of a supporting point or portion SP2 that supports the display panel 100. For example, the equivalent module EM on the display panel 100 may correspond to one module having the same characteristic as that of a module implemented by coupling or connecting the second vibration-generating device 700, the second adhesive member AD2, the reinforcement plate 800, and the first vibration-generating device 500. Also, the second structure 300 may be used as the supporting point or portion SP2 that supports the display panel 100. Accordingly, the second structure 300 may support the edge or periphery of the display panel 100, and thus, may be used as a housing of the display apparatus, and may determine a deflection value corresponding to the display panel 100 for setting the second resonance frequency. For example, a first resonance frequency 'f' corresponding to the reinforcement plate 800 and a second resonance frequency 'f' corresponding to the display panel 100 may each be determined based on a deflection value 'δ' as in the following Equation below, which is the same as the Equation above.

$$f = \frac{1}{2\pi}\left(\frac{g}{\delta}\right)^{0.5} \quad \text{[Equation]}$$

For example, 'g' denotes an acceleration of gravity (for example, 9.81 m/s$^2$), and 'δ' denotes a deflection value corresponding to the reinforcement plate 800 or the display panel 100. For example, when the deflection value 'δ' increases, the resonance frequency 'f' may decrease, and when the deflection value 'δ' decreases, the resonance frequency 'f' may increase. Therefore, the first resonance frequency may be set based on a mass of the first vibration-generating device 500, a material and a thickness of the reinforcement plate 800, and a deflection value determined based on a position of the supporting point or portion SP1 that supports the reinforcement plate 800; and the second resonance frequency may be set based on a mass of an equivalent module on the display panel 100, a material and a thickness of the display panel 100, and a deflection value determined based on a position of the supporting point or portion SP2 that supports the display panel 100.

According to an embodiment of the present disclosure, the display apparatus may identically set a first resonance frequency "f1" corresponding to the reinforcement plate 800 and a second resonance frequency "f2" corresponding to the display panel 100, e.g., f1=f2. Thus, the display apparatus may allow a vibration of the reinforcement plate 800 to overlap a vibration of the display panel 100, thereby enhancing a sound pressure level in a corresponding frequency domain.

According to another embodiment of the present disclosure, the display apparatus may adjust the first resonance frequency "f1" corresponding to the reinforcement plate 800 to a frequency that is 'n' (where 'n' is a natural number greater than or equal to two) times the second resonance frequency "f2" corresponding to the display panel 100, e.g., f1=n*f2. Thus, the display apparatus may allow the vibration of the reinforcement plate 800 to overlap the vibration of the display panel 100, thereby enhancing a sound pressure level in a corresponding frequency domain.

Therefore, the display apparatus may identically adjust (f1=f2) the first resonance frequency "f1" corresponding to the reinforcement plate 800 and the second resonance frequency "f2" corresponding to the display panel 100, or may adjust (f1=n*f2) the first resonance frequency "f1" corresponding to the reinforcement plate 800 to a frequency that is 'n' times the second resonance frequency "f2" corresponding to the display panel 100. Thus, the display apparatus may amplify the vibration of the reinforcement plate 800 and the vibration of the display panel 100, thereby enhancing a sound output characteristic in a low-pitched sound range.

According to an embodiment of the present disclosure, the display apparatus may adjust a resonance frequency having a haptic function, based on the first resonance frequency corresponding to the reinforcement plate 800 and the second resonance frequency corresponding to the display panel 100. For example, the display apparatus may identically set the first resonance frequency corresponding to the reinforcement plate 800 and the second resonance frequency corresponding to the display panel 100, or may set the first resonance frequency corresponding to the reinforcement plate 800 to a frequency that is 'n' (where 'n' is a natural number greater than or equal to two) times the second resonance frequency corresponding to the display panel 100. Thus, the display apparatus may apply the haptic function for providing a user with a feedback that may transfer a touch sensation.

Figure 13:
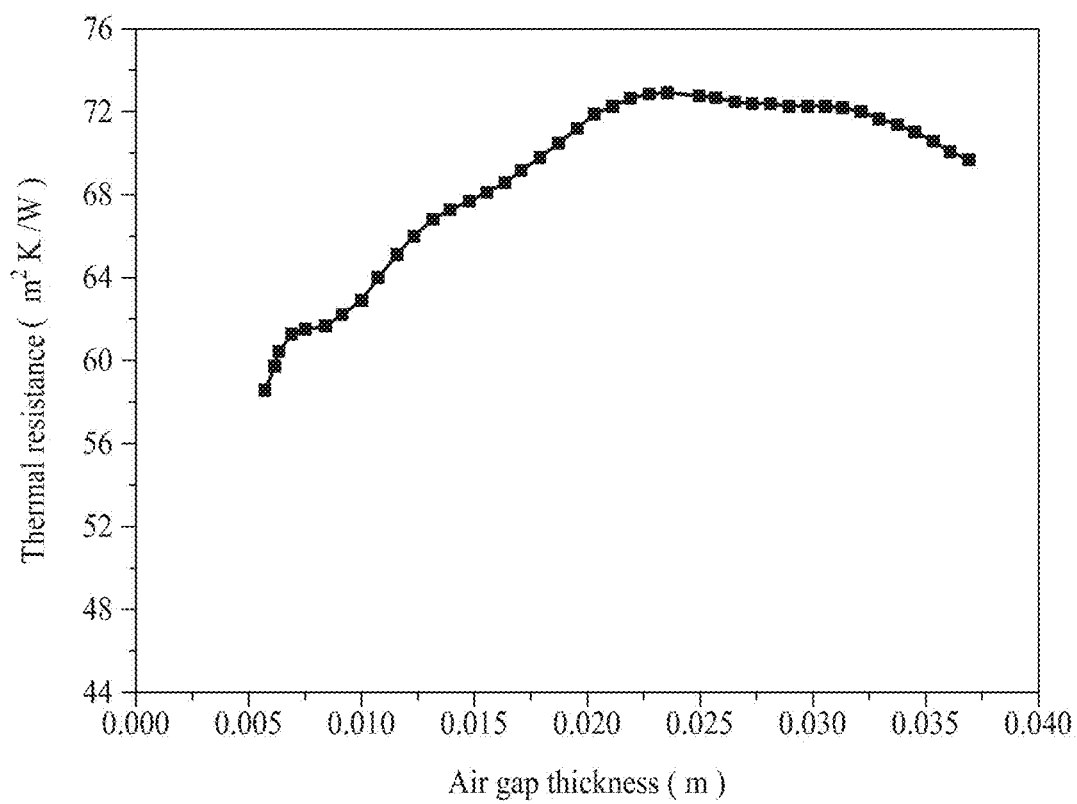
FIG. 13 is a graph showing experimental results of a heat transfer prevention effect based on an air gap provided between a display panel and a first vibration-generating device in a display apparatus according to an embodiment of the present disclosure.

FIG. 13 is a graph showing experimental results of a heat transfer prevention effect based on an air gap provided between a display panel and a first vibration-generating device in a display apparatus according to an embodiment of the present disclosure.

With reference to FIG. 13, the display apparatus may further include an air gap AG between a first vibration-generating device 500 and a display panel 100. For example, a space may be formed between the display panel 100 and the reinforcement plate 800 in the first vibration-generating device 500. Thus, the air gap AG may reduce or prevent heat occurring in the first vibration-generating device 500 from being transferred to the display panel 100.

According to an embodiment of the present disclosure, as a thickness of the air gap AG increases, a thermal resistance or a heat blocking effect of the display apparatus may be enhanced. For example, when the thickness of the air gap AG increases from about 0.005 m to about 0.025 m, the thermal resistance may increase from about 58 $m^2K/W$ to about 72 $m^2K/W$. Thus, heat transfer may be prevented. For example, heat occurring in the first vibration-generating device 500 may be transferred to the air gap AG. Thus, heat transferred to the display panel 100 may be reduced. For example, when the thickness of the air gap AG is greater than about 0.025 m, the thermal resistance may no longer increase.

Therefore, the display apparatus according to an embodiment of the present disclosure may include the high-pitched sound-range vibration-generating device for vibrating the display panel and the low-pitched sound-range vibration-generating device for vibrating the vibration plate on the first surface of the display panel, thereby enhancing a sound output characteristic of each of the high-pitched sound range and the low-pitched sound range. Moreover, the display apparatus according to an embodiment of the present disclosure may output vibrations, generated from the both surfaces or portions of the vibration plate, through both side surfaces or both portions of the display apparatus to enhance a sound output characteristic of the low-pitched sound range.

Moreover, the display apparatus according to an embodiment of the present disclosure may use, instead of the display panel, a vibration plate as a vibration plate of the low-frequency domain having a large vibration displacement, thereby providing a high-quality image. Moreover, the display apparatus according to an embodiment of the present disclosure may set a resonance frequency of the display panel using the air gap between the display panel and the vibration-generating device vibrating the vibration plate, thereby improving a frequency characteristic.

A display apparatus according to an embodiment of the present disclosure may output sound toward a region in front of the display panel. Accordingly, a position of an image displayed by the display apparatus may match a position of sound generated by the display apparatus, thereby enhancing an immersion experience of a viewer who may be viewing an image displayed by the display apparatus.

Moreover, a display apparatus according to an embodiment of the present disclosure may include the high-pitched sound range vibration-generating device for vibrating the display panel, and the low-pitched sound range vibration-generating device for vibrating the vibration plate on the first surface of the display panel, thereby enhancing a sound output characteristic of each of the high-pitched sound range and the low-pitched sound range. Moreover, a display apparatus according to an embodiment of the present disclosure may output vibrations, generated from both surfaces of the vibration plate, through both surfaces of the display apparatus to enhance a sound output characteristic of the low-pitched sound range.

Moreover, a display apparatus according to an embodiment of the present disclosure may use, instead of the display panel, a vibration plate as a vibration plate of the low frequency domain having a large vibration displacement, thereby providing a high-quality image. Moreover, a display apparatus according to an embodiment of the present disclosure may adjust a resonance frequency of the display panel by forming an air gap in between the display panel and the vibration-generating device vibrating the vibration plate, thereby improving a frequency characteristic. Moreover, the display apparatus according to the present disclosure may reduce or prevent heat, occurring in the vibration-generating device disposed on the first surface of the display panel to vibrate the vibration plate, from being transferred to the display panel.

The display panel applied to the display apparatus according to an embodiment of the present disclosure may be any type of display panel, such as an LCD panel, an organic light-emitting diode display panel, a quantum dot light-emitting display panel, and an electroluminescent display panel, but embodiments are not limited to a specific display panel. For example, the display panel according to an embodiment of the present disclosure may use any display panels that may be vibrated by the sound generating device according to an embodiment of the present disclosure to generate sound. Also, the display apparatus according to an embodiment of the present disclosure may include a display panel including an organic light-emitting layer, a quantum dot light-emitting layer, and a micro light-emitting diode.

Moreover, the vibration-generating device according to an embodiment of the present disclosure may be applied to display apparatuses. The display apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, portable multimedia players (PMPs), personal digital assistants (PDAs), electronic organizers, desktop personal computers (PCs), laptop PCs, netbook computers, workstations, navigation apparatuses, automotive navigation apparatuses, automotive display apparatuses, televisions (TVs), notebook computers, monitors, cameras, camcorders, home appliances, etc.

A display apparatus according to an embodiment of the present disclosure will be described below.

According to an embodiment of the present disclosure, a display apparatus may include: a display panel configured to display an image, a vibration plate on a first surface of the display panel, a first structure on a second surface of the vibration plate, the first structure being configured to support the display panel, a first vibration-generating device configured to vibrate the vibration plate, and a separation part connected to the vibration plate and configured to separate a first space, facing a first surface opposite to the second surface of the vibration plate, from a second space facing the second surface of the vibration plate.

For example, in the display apparatus according to an embodiment of the present disclosure, the separation part may include: a first separation part connecting a first portion of the vibration plate to a first portion of the display panel, and a second separation part connecting a second portion opposite to the first portion of the vibration plate to a second portion opposite to a first portion of the first structure. For example, in the display apparatus according to an embodiment of the present disclosure, the separation part may be further configured to separate the first space, facing the first surface of the vibration plate, from a third space between a first portion of the display panel and a first portion of the first structure. For example, in the display apparatus according to an embodiment of the present disclosure, the separation part may be further configured to separate the second space, facing the second surface opposite to the first surface of the vibration plate, from a fourth space between a second portion opposite to a first portion of the display panel and a second portion opposite to a first portion of the first structure.

For example, in the display apparatus according to an embodiment of the present disclosure, the first vibration-generating device may be between the display panel and the vibration plate. For example, the display apparatus according to an embodiment of the present disclosure may further include a second vibration-generating device on the first surface of the display panel, the second vibration-generating device being configured to vibrate the display panel.

For example, in the display apparatus according to an embodiment of the present disclosure, the first and second vibration-generating devices may overlap each other in a thickness direction of the display panel. For example, in the display apparatus according to an embodiment of the present disclosure, the first vibration-generating device may be configured to generate a vibration corresponding to a low-pitched sound range, and the second vibration-generating device may be configured to generate a vibration corresponding to a high-pitched sound range.

For example, the display apparatus according to an embodiment of the present disclosure may further include a reinforcement plate between the first and second vibration-generating devices. For example, in the display apparatus according to an embodiment of the present disclosure, the reinforcement plate may be configured as a vibration plate corresponding to a low frequency domain, and has a haptic function.

For example, in the display apparatus according to an embodiment of the present disclosure, a first resonance frequency of the reinforcement plate may be equal to a second resonance frequency of the display panel, and the reinforcement plate may have a haptic function. For example, in the display apparatus according to an embodiment of the present disclosure, a first resonance frequency of the reinforcement plate may be a frequency that is 'n' times a second resonance frequency of the display panel, where 'n' is a natural number greater than or equal to two, and the reinforcement plate may have a haptic function.

For example, the display apparatus according to an embodiment of the present disclosure may further include an adhesive member between a periphery of the reinforcement plate and a periphery of the second vibration-generating device, the adhesive member being configured to attach the reinforcement plate to the second vibration-generating device. For example, the display apparatus according to an embodiment of the present disclosure may further include an air gap surrounded by the reinforcement plate, the second vibration-generating device, and the adhesive member. For example, in the display apparatus according to an embodiment of the present disclosure, the air gap may overlap the first vibration-generating device.

For example, the display apparatus according to an embodiment of the present disclosure may further include a second structure between a periphery of the display panel and a periphery of the first structure, the second structure connecting the display panel to the first structure, the second structure defining a hole configured to discharge a vibration, generated by the first vibration-generating device, to outside of the second structure. For example, in the display apparatus according to an embodiment of the present disclosure, the second structure may define: a first hole connected to the second space facing the second surface of the vibration plate, the first hole being in a first portion of the second structure, and a second hole connected to the first space facing the first surface of the vibration plate, the second hole being in a second portion opposite to the first portion of the second structure. For example, in the display apparatus according to an embodiment of the present disclosure, the first hole may be configured to discharge a vibration, generated by the second surface of the vibration plate, to outside of the second structure, and the second hole may be configured to discharge a vibration, generated by the first surface of the vibration plate, to outside of the second structure.

According to an embodiment of the present disclosure, a display apparatus may include: a display panel configured to display an image, a vibration plate on a first surface of the display panel, a first structure on a second surface of the vibration plate, the first structure being configured to support the display panel, a first vibration-generating device between the display panel and the vibration plate, the first vibration-generating device being configured to vibrate the vibration plate, a second vibration-generating device that does overlap the first vibration-generating device, the second vibration-generating device being configured to vibrate the display panel, and a separation part connected to the vibration plate and configured to separate a first space, facing a first surface opposite to the second surface of the vibration plate, from a second space facing the second surface of the vibration plate.

For example, in the display apparatus according to an embodiment of the present disclosure, the separation part may include: a first separation part connecting a first portion of the vibration plate to a first portion of the display panel, and a second separation part connecting a second portion opposite to the first portion of the vibration plate to a second portion opposite to a first portion of the first structure. For example, in the display apparatus according to an embodiment of the present disclosure, the separation part may be further configured to separate the first space, facing the first surface of the vibration plate, from a third space between a first portion of the display panel and a first portion of the first structure. For example, in the display apparatus according to an embodiment of the present disclosure, the separation part may be further configured to separate the second space, facing a second surface opposite to the first surface of the vibration plate, from a fourth space between a second portion opposite to a first portion of the display panel and a second portion opposite to a first portion of the first structure.

For example, the display apparatus according to an embodiment of the present disclosure may further include a reinforcement plate between the display panel and the first vibration-generating device. For example, in the display apparatus according to an embodiment of the present disclosure, the reinforcement plate may be configured as a vibration plate corresponding to a low frequency domain, and may have a haptic function.

For example, in the display apparatus according to an embodiment of the present disclosure, a first resonance frequency of the reinforcement plate may be equal to a second resonance frequency of the display panel, and the reinforcement plate may have a haptic function. For example, in the display apparatus according to an embodiment of the present disclosure, a first resonance frequency of the reinforcement plate may be a frequency that is 'n' times a second resonance frequency of the display panel, where 'n' is a natural number greater than or equal to two, and the reinforcement plate may have a haptic function.

For example, in the display apparatus according to an embodiment of the present disclosure, the second vibration-generating device may include a plurality of sound generating modules configured to vibrate a plurality of regions of the display panel, and the display apparatus may further include a vibration absorption member configured to divide the plurality of regions of the display panel.

For example, the display apparatus according to an embodiment of the present disclosure may further include a vibration absorption member on the first surface of the display panel, the vibration absorption member being spaced apart from the reinforcement plate. For example, the display apparatus according to an embodiment of the present disclosure may further include an adhesive member between a periphery of the reinforcement plate and a periphery of the display panel, the adhesive member being configured to attach the reinforcement plate to the display panel. For example, the display apparatus according to an embodiment of the present disclosure may further include an air gap surrounded by the reinforcement plate, the display panel, the vibration absorption member, and the adhesive member.

For example, the display apparatus according to an embodiment of the present disclosure may further include a second structure between a periphery of the display panel and a periphery of the first structure, the second structure being configured to connect the display panel to the first structure, the second structure being inclined from a vertical direction of the display panel. For example, in the display apparatus according to an embodiment of the present disclosure, the second structure may define a hole configured to discharge a vibration, generated by the first vibration-generating device, to outside the second structure. For example, in the display apparatus according to an embodiment of the present disclosure, the second structure may define: a first hole connected to the second space facing the second surface of the vibration plate, the first hole being in a first portion of the second structure, and a second hole connected to the first space facing the first surface of the vibration plate, the second hole being in a second portion opposite to the first portion of the second structure.

It will be apparent to those skilled in the art that various modifications and variations may be made in the present disclosure without departing from the technical idea or scope of the disclosure. Thus, it is intended that embodiments of the present disclosure cover the modifications and variations of the disclosure provided they come within the scope of the appended claims and their equivalents.

What is claimed is:

1. A display apparatus, comprising:
    a display panel configured to display an image;
    a vibration plate on a first surface of the display panel;
    a first structure on a second surface of the vibration plate, the first structure being configured to support the display panel;
    a first vibration-generating device configured to vibrate the vibration plate; and
    a separation part connected to the vibration plate and configured to separate a first space, facing a first surface opposite to the second surface of the vibration plate, from a second space facing the second surface of the vibration plate,
    wherein the separation part directly faces each of the first space and the second space.

2. The display apparatus of claim 1, wherein the separation part comprises:
    a first separation part connecting a first portion of the vibration plate to a first portion of the display panel; and
    a second separation part connecting a second portion opposite to the first portion of the vibration plate to a second portion opposite to a first portion of the first structure.

3. The display apparatus of claim 1, wherein the separation part is further configured to separate the first space from a third space between a first portion of the display panel and a first portion of the first structure.

4. The display apparatus of claim 1, wherein the separation part is further configured to separate the second space from a fourth space between a second portion opposite to a first portion of the display panel and a second portion opposite to a first portion of the first structure.

5. The display apparatus of claim 1, wherein the first vibration-generating device is between the display panel and the vibration plate.

6. The display apparatus of claim 1, further comprising a second vibration-generating device on the first surface of the display panel, the second vibration-generating device being configured to vibrate the display panel.

7. The display apparatus of claim 6, wherein the first and second vibration-generating devices overlap each other in a thickness direction of the display panel.

8. The display apparatus of claim 6, wherein:
the first vibration-generating device is configured to generate a vibration corresponding to a low-pitched sound range; and
the second vibration-generating device is configured to generate a vibration corresponding to a high-pitched sound range.

9. The display apparatus of claim 6, further comprising a reinforcement plate between the first and second vibration-generating devices.

10. The display apparatus of claim 9, wherein the reinforcement plate is configured as a vibration plate corresponding to a low frequency domain, and has a haptic function.

11. The display apparatus of claim 9, wherein:
a first resonance frequency of the reinforcement plate is equal to a second resonance frequency of the display panel; and
the reinforcement plate has a haptic function.

12. The display apparatus of claim 9, wherein:
a first resonance frequency of the reinforcement plate is a frequency that is 'n' times a second resonance frequency of the display panel, where 'n' is a natural number greater than or equal to two; and
the reinforcement plate has a haptic function.

13. The display apparatus of claim 9, further comprising an adhesive member between a periphery of the reinforcement plate and a periphery of the second vibration-generating device, the adhesive member being configured to attach the reinforcement plate to the second vibration-generating device.

14. The display apparatus of claim 13, further comprising an air gap surrounded by the reinforcement plate, the second vibration-generating device, and the adhesive member.

15. The display apparatus of claim 14, wherein the air gap overlaps the first vibration-generating device.

16. The display apparatus of claim 1, further comprising a second structure between a periphery of the display panel and a periphery of the first structure, the second structure connecting the display panel to the first structure, the second structure defining a hole configured to discharge a vibration, generated by the first vibration-generating device, to outside of the second structure.

17. The display apparatus of claim 16, wherein the second structure defines:
a first hole connected to the second space, the first hole being in a first portion of the second structure; and
a second hole connected to the first space, the second hole being in a second portion opposite to the first portion of the second structure.

18. The display apparatus of claim 17, wherein:
the first hole is configured to discharge a vibration, generated by the second surface of the vibration plate, to outside of the second structure, and
the second hole is configured to discharge a vibration, generated by the first surface of the vibration plate, to outside of the second structure.

19. A display apparatus, comprising:
a display panel configured to display an image;
a vibration plate on a first surface of the display panel;
a first structure on a second surface of the vibration plate, the first structure being configured to support the display panel;
a first vibration-generating device between the display panel and the vibration plate, the first vibration-generating device being configured to vibrate the vibration plate;
a second vibration-generating device that does overlap the first vibration-generating device between the display panel and the vibration plate, the second vibration-generating device being configured to vibrate the display panel; and
a separation part connected to the vibration plate and configured to separate a first space, facing a first surface opposite to the second surface of the vibration plate, from a second space facing the second surface of the vibration plate.

20. The display apparatus of claim 19, wherein the separation part comprises:
a first separation part connecting a first portion of the vibration plate to a first portion of the display panel; and
a second separation part connecting a second portion opposite to the first portion of the vibration plate to a second portion opposite to a first portion of the first structure.

21. The display apparatus of claim 19, wherein the separation part is further configured to separate the first space from a third space between a first portion of the display panel and a first portion of the first structure.

22. The display apparatus of claim 19, wherein the separation part is further configured to separate the second space from a fourth space between a second portion opposite to a first portion of the display panel and a second portion opposite to a first portion of the first structure.

23. The display apparatus of claim 19, further comprising a reinforcement plate between the display panel and the first vibration-generating device.

24. The display apparatus of claim 23, wherein the reinforcement plate is configured as a vibration plate corresponding to a low frequency domain, and has a haptic function.

25. The display apparatus of claim 23, wherein:
a first resonance frequency of the reinforcement plate is equal to a second resonance frequency of the display panel; and
the reinforcement plate has a haptic function.

26. The display apparatus of claim 23, wherein:
a first resonance frequency of the reinforcement plate is a frequency that is 'n' times a second resonance frequency of the display panel, where 'n' is a natural number greater than or equal to two; and
the reinforcement plate has a haptic function.

27. The display apparatus of claim 23, further comprising a vibration absorption member on the first surface of the display panel, the vibration absorption member being spaced apart from the reinforcement plate.

28. The display apparatus of claim 27, further comprising an adhesive member between a periphery of the reinforcement plate and a periphery of the display panel, the adhesive member being configured to attach the reinforcement plate to the display panel.

29. The display apparatus of claim 28, further comprising an air gap surrounded by the reinforcement plate, the display panel, the vibration absorption member, and the adhesive member.

30. The display apparatus of claim 19, wherein:
the second vibration-generating device comprises a plurality of sound generating modules configured to vibrate a plurality of regions of the display panel; and
the display apparatus further comprises a vibration absorption member configured to divide the plurality of regions of the display panel.

31. The display apparatus of claim 19, further comprising a second structure between a periphery of the display panel and a periphery of the first structure, the second structure being configured to connect the display panel to the first structure, the second structure being inclined from a vertical direction of the display panel.

32. The display apparatus of claim 31, wherein the second structure defines a hole configured to discharge a vibration, generated by the first vibration-generating device, to outside the second structure.

33. The display apparatus of claim 31, wherein the second structure defines:
a first hole connected to the second space, the first hole being in a first portion of the second structure; and
a second hole connected to the first space, the second hole being in a second portion opposite to the first portion of the second structure.

* * * * *